US008628407B2

(12) United States Patent
Arezina et al.

(10) Patent No.: US 8,628,407 B2
(45) Date of Patent: Jan. 14, 2014

(54) COMMUNITY GAMING SYSTEM OUTCOME INDICATORS

(75) Inventors: Vladimir I. Arezina, Chicago, IL (US); Larry J. Pacey, Northbrook, IL (US); Joel R. Jaffe, Glenview, IL (US); Shridhar P. Joshi, Naperville, IL (US); Allon G. Englman, Chicago, IL (US); Alfred Thomas, Las Vegas, NV (US)

(73) Assignee: WMS Gaming Inc., Waukegan, IL (US)

( * ) Notice: Subject to any disclaimer, the term of this patent is extended or adjusted under 35 U.S.C. 154(b) by 674 days.

(21) Appl. No.: 11/991,572

(22) PCT Filed: Sep. 7, 2006

(86) PCT No.: PCT/US2006/034734
§ 371 (c)(1),
(2), (4) Date: Nov. 3, 2009

(87) PCT Pub. No.: WO2007/030552
PCT Pub. Date: Mar. 15, 2007

(65) Prior Publication Data

US 2010/0041464 A1 Feb. 18, 2010

Related U.S. Application Data

(60) Provisional application No. 60/715,826, filed on Sep. 9, 2005.

(51) Int. Cl.
*A63F 13/12* (2006.01)
*A63F 13/10* (2006.01)

(52) U.S. Cl.
USPC .............................................. 463/25; 463/16

(58) Field of Classification Search
USPC .................. 463/42, 46, 16–17, 18–22, 23–28
See application file for complete search history.

(56) References Cited

U.S. PATENT DOCUMENTS

| | | | | |
|---|---|---|---|---|
| 4,805,907 | A * | 2/1989 | Hagiwara | 463/26 |
| 5,779,544 | A * | 7/1998 | Seelig et al. | 463/6 |
| 5,911,418 | A * | 6/1999 | Adams | 273/274 |
| 6,364,314 | B1 * | 4/2002 | Canterbury | 273/274 |
| 6,506,117 | B2 * | 1/2003 | DeMar et al. | 463/20 |
| 6,607,195 | B2 * | 8/2003 | Vancura | 273/274 |

(Continued)

FOREIGN PATENT DOCUMENTS

| | | | | |
|---|---|---|---|---|
| GB | 2135490 | | 2/1983 | G07F 17/34 |
| GB | 2135490 | A * | 8/1984 | G07F 17/34 |

OTHER PUBLICATIONS

International Search Report, (3 pages) dated May 7, 2007.

*Primary Examiner* — Arthur O. Hall
*Assistant Examiner* — Bach Hoang
(74) *Attorney, Agent, or Firm* — Nixon Peabody LLP

(57) ABSTRACT

A gaming system for playing a wagering game is provided which includes a plurality of gaming machines (10*a*-1Of) configured to play a wagering game and to participate in a community-event. A movable member (99) is disposed substantially adjacent to the plurality of gaming machines and is configured to move relative to the plurality of gaining machines from a first position to a second position during a community-event (S500) in response to a single triggering event (S505). The movable member is moved relative to the plurality of gaming machines during a community-event to reveal at least one community-event outcome for the community-event (S510)

27 Claims, 16 Drawing Sheets

(56) References Cited

U.S. PATENT DOCUMENTS

| | | | | |
|---|---|---|---|---|
| 6,869,361 | B2 * | 3/2005 | Sharpless et al. | 463/25 |
| 7,311,598 | B2 * | 12/2007 | Kaminkow et al. | 463/16 |
| 7,485,043 | B2 * | 2/2009 | Beaulieu et al. | 463/42 |
| 7,559,840 | B1 * | 7/2009 | D'Avanzo | 463/30 |
| 7,654,896 | B2 * | 2/2010 | Baerlocher | 463/16 |
| 7,722,464 | B2 * | 5/2010 | Cuddy et al. | 463/26 |
| 7,727,072 | B2 * | 6/2010 | Crowder et al. | 463/42 |
| 8,162,743 | B2 * | 4/2012 | Beaulieu et al. | 463/20 |
| 8,187,068 | B2 * | 5/2012 | Slomiany et al. | 463/9 |
| 2001/0004607 | A1 * | 6/2001 | Olsen | 463/26 |
| 2003/0148804 | A1 * | 8/2003 | Ikeya et al. | 463/16 |
| 2003/0236110 | A1 * | 12/2003 | Beaulieu et al. | 463/1 |
| 2004/0053660 | A1 * | 3/2004 | Webb et al. | 463/16 |
| 2004/0235551 | A1 * | 11/2004 | Walker et al. | 463/16 |
| 2006/0009283 | A1 * | 1/2006 | Englman et al. | 463/29 |
| 2006/0121971 | A1 * | 6/2006 | Slomiany et al. | 463/16 |
| 2008/0004106 | A1 * | 1/2008 | Bryant et al. | 463/20 |
| 2009/0023491 | A1 * | 1/2009 | Ikeya et al. | 463/20 |
| 2009/0104975 | A1 * | 4/2009 | Beaulieu et al. | 463/20 |
| 2010/0035674 | A1 * | 2/2010 | Slomiany et al. | 463/9 |
| 2012/0172123 | A1 * | 7/2012 | Beaulieu et al. | 463/31 |

* cited by examiner

COMMUNITY GAMING SYSTEM OUTCOME INDICATORS

CROSS-REFERENCE TO RELATED APPLICATIONS

This application is a U.S. national phase of, and claims priority to, International Application No. PCT/US2006/034734 filed Sep. 7, 2006 which claims the benefit of priority of U.S. Provisional Patent Application No. 60/715,826, filed Sep. 9, 2005, both of which both of which are incorporated by reference in their entireties.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming machines, and methods for playing wagering games, and more particularly, to a gaming system having a gaming machine for determining a community-event outcome that is shared with other gaming machines of the gaming system.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

One concept that has been successfully employed to enhance the entertainment value of a game is the concept of a "secondary" or "bonus" game that may be played in conjunction with a "basic" game. The bonus game may comprise any type of game, either similar to or completely different from the basic game, which is entered upon the occurrence of a selected event or outcome in the basic game. Generally, bonus games provide a greater expectation of winning than the basic game and may also be accompanied with more attractive or unusual video displays and/or audio. Bonus games may additionally award players with "progressive jackpot" awards that are funded, at least in part, by a percentage of coin-in from the gaming machine or a plurality of participating gaming machines. Because the bonus game concept offers tremendous advantages in player appeal and excitement relative to other known games, and because such games are attractive to both players and operators, there is a continuing need to develop gaming machines with new types of bonus games to satisfy the demands of players and operators.

To provide randomly generated numbers related to the bonus game, some current bonus games use a random number generator that is included in a server of the bonus game. One problem associated with this type of server is that the server is categorized as a gaming machine and, therefore, it is required to meet numerous gaming regulations typically associated with a gaming machine including criteria related to randomness, fairness, and/or tampering. Thus, a need exists for a wagering game system with a bonus game, or community-event, having a shared outcome that is determined by a gaming machine and at least some aspects of the present concepts are directed to satisfying this need.

Current community-event games also utilize video displays and signage to display the play of and results of the community-events. An additional need addressed by various aspects of the present concepts is to provide a more visceral and physically tangible community-event game by incorporating a three-dimensional movable member visible and/or accessible to all players.

SUMMARY OF THE INVENTION

According to one aspect of the present invention, a gaming system for playing a wagering game is provided which comprises a plurality of gaming machines configured to play a wagering game and to participate in a community-event. A movable member is disposed substantially adjacent to the plurality of gaming machines and is configured to move relative to the plurality of gaming machines from a first position to a second position during a community-event in response a single triggering event. The movable member is moved relative to the plurality of gaming machines during a community-event to reveal at least one community-event outcome for the community-event.

In accord with at least some aspects of the above embodiment, the movable member is configured to translate along at least a second axis substantially perpendicular to the first axis, the movable member may bear a plurality of award indicia relating to the community-event, the movable member may further comprise a dynamic award indicia, or the movable member may comprise a plurality of movable members selected from the group consisting of game board, mechanism, wheel, reel, actuator, and gear. The aforementioned movable member may comprise a plurality of intermeshed gears, wherein at least a first gear may comprise an award indicia or a pointer positionable in accord with a predetermined rotation of the first gear by a controller relative to a corresponding pointer or award indicia on another gear or on a stationary member. In any of the above aspects, the movable member may bear at least one of an award indicia and a display configured to display an award indicia. In any of the above aspects, at least of an award indicia and a display configured to display an award indicia may be disposed adjacent to the movable member. The aforementioned dynamic award indicia may comprise a video display or a rotating mechanical substrate having a plurality of surfaces, each of the plurality of surfaces bearing at least one award indicia. In aspects of the above gaming system, a second gaming machine of the plurality of gaming machines is configured to receive a community-event invitation in response to the community-event being initiated. The random number generator may reside in one of the plurality of gaming machines.

According to another aspect of the invention, a method of conducting a wagering game on a plurality of gaming machines eligible to play a community-event is provided and comprises the acts of determining a randomly selected community-event outcome and transmitting the community-event outcome to at least one of the plurality of gaming machines participating in the community-event. The method also includes the act of conducting the community-event at participating ones of the plurality of gaming machines in accordance with the community-event outcome by moving a movable member to reveal the community-event outcome in response a single triggering event.

The determining step may include aggregating a randomly selected first sub-outcome and a randomly selected second sub-outcome to obtain the randomly selected community-event outcome. The step of conducting the community-event may include displaying the community-event on a display that is viewable by the players at the plurality of gaming machines. The movable member may comprise at least one of a rotatable game board, mechanism, wheel, reel, actuator, and a gear, and wherein the step of moving of the movable member to reveal the community-event outcome may comprise rotating the movable member about at least a first axis. The step of moving of the movable member to reveal the community-event outcome may comprise translating at least a portion of the movable member or translating another movable member along at least a second axis substantially perpendicular to the first axis. The step of moving of the movable member to reveal the community-event outcome may comprise positioning an award indicia borne by the movable member adjacent an indicator. The movable member may comprise a plurality of movable members selected from the group consisting of game board, mechanism, wheel, reel, actuator, and gear, and wherein the step of moving of the movable member to reveal the community-event outcome may comprise at least one of rotating and translating the movable member. The movable member may bear at least one of an award indicia and a display configured to display an award indicia. At least of an award indicia and a display configured to display an award indicia may be disposed adjacent to the movable member. The movable member may comprise a dynamic award indicia configured to change a displayed award indicia upon receipt of a command signal from a controller. The dynamic award indicia may comprise a video display, wherein the reveal of the community-event outcome may comprise displaying an award indicia corresponding to the community-event outcome on the video display. The dynamic award indicia may comprise a rotating mechanical substrate having a plurality of surfaces, each of the plurality of surfaces bearing at least one award indicia, and wherein the step of moving of the movable member to reveal the community-event outcome may comprise rotating the rotating mechanical substrate to reveal a selected one of the plurality of surfaces. The aforementioned method may further comprise the act of receiving, at the participating ones of the plurality of gaming machines, an invitation for playing the community-event in response to the community-event being triggered, the invitation being accepted in response to a player input. The aforementioned method may further comprise the act of providing a time limit for receiving the player input, a player being unable to join the community-event after the time limit has expired. The aforementioned method may further comprise the act of playing the wagering game locally in the first one of the plurality of gaming machines, the wagering game having outcomes determined by a random number generator that is also used for determining the randomly selected community-event outcome. The aforementioned method may further comprise the act of distributing, via a community-event server, signals related to the community-event. The aforementioned method may further comprise the act of interrupting a local wagering game being performed on at least one of the plurality of gaming machines to perform the conducting of the community-event. The present concepts also include providing a computer readable storage medium or media encoded with instructions for directing the gaming machines to perform a method in accord with any of the above aspects.

According to yet another aspect of the invention, a method of conducting a community-event on a plurality of linked gaming machines configured to play the community-event is provide and comprises the acts of initiating a session of the community-event in which at least one of the plurality of linked gaming machines participates. Following an act of determining an outcome for the community-event, the method includes moving a movable member in response to the outcome to reveal the community-event outcome. At least one of the steps of a determining an outcome for the community-event and moving the movable member to reveal the community-event outcome is performed in response a single triggering event.

According to yet another aspect of the invention, a method of conducting a wagering game on a plurality of gaming machines eligible to play a community-event is provided and includes the acts of determining a randomly selected community-event outcome and conducting the community-event at participating ones of the plurality of gaming machines in accordance with the community-event outcome by moving a movable member to reveal the community-event outcome.

According to yet another aspect of the invention, a method of conducting a wagering game on a plurality of gaming machines eligible to play a community-event is provided which comprises the acts of determining a randomly selected initial community-event outcome, transmitting the initial community-event outcome to a controller configured to control movement of a movable member, and moving the movable member to reveal the initial community-event outcome.

In accord with at least some aspects of the above method, the method may further comprise the act of nudging the movable member through a randomly determined additional movement following the reveal of the initial community-event outcome to reveal a final community-event outcome. The nudging step may comprise nudging the movable member through a randomly determined additional movement in a direction selected by a player placing a side bet enabling the nudge feature. In accord with at least some aspects of the above method, the method may further comprise the acts of accepting a plurality of side bets from a plurality of gaming machines, enabling a nudge feature in response to the plurality of side bets being placed prior to at least one of the determining step, transmitting step, and moving step, and nudging the movable member through a randomly determined additional movement in response to an input from each of the plurality of gaming machines to reveal a final community-event outcome. In accord with still other aspects of the above method, the method may further comprise the acts of accepting a plurality of side bets from a plurality of gaming machines, enabling a nudge feature in response to the plurality of side bets being placed prior to at least one of the determining step, transmitting step, and moving step, randomly determining an additional movement of the movable member in one of at least a first direction and a second direction for each of the side bets placed on the plurality of gaming machines, summing the randomly determined additional movements of the movable member to yield an aggregate additional movement of the movable member, and nudging the movable member through the aggregate additional movement to reveal a final community-event outcome.

According to yet another aspect of the invention, a method of conducting a community-event on a plurality of gaming machines disposed adjacent a movable member includes the acts of providing a movable member adjacent the plurality of gaming machines, the movable member bearing at least one award indicia, and providing a plurality of indicators disposed adjacent the movable member, each of the indicators being related to one of a plurality of potential outcomes for the community-event. The method further includes the acts of assigning an indicator to each of the plurality of gaming machines eligible to play the community-event and determining a random community-event outcome. The community-event outcome is then transmitted to a controller configured to control movement of the movable member and the movable member moved relative to the plurality of indicators. The method also includes the act of stopping a movement of the moveable member to associate the award indicia to the indicator.

In accord with at least some aspects of the above method, the method may further comprises the acts of accepting a side bet, associating at least one additional indicator with a gaming machine accepting a side bet, and awarding an award indicated by the award indicia to any gaming machine having an indicator disposed adjacent the award indicia. In accord with other aspects of the above method, the method may further comprise the act of awarding an award indicated by the award indicia to any gaming machine having an indicator disposed opposite the indicator adjacent the award indicia on an opposite side of the movable member. In accord with yet other aspects of the above method, the method may further comprise the act of awarding an award comprising at least one of the award indicated by the award indicia and another award to another one of the plurality of gaming machines which does not have an indicator disposed adjacent the award indicia. The awarding an award step further may comprise randomly selecting an indicator having a predetermined relation to the indicator disposed adjacent the award indicia.

According to yet another aspect of the invention, a method of conducting a wagering game on a plurality of gaming machines that are eligible to play a community-event comprises the acts of randomly determining a first community-event outcome, randomly determining a second community-event outcome, and transmitting the first and second community-event outcomes to a controller configured to control movement of a movable member having a plurality of award indicia displayed thereon. The method also includes the acts of performing a first movement of the movable member to associate an award indicia relating to the first community-event outcome to a randomly determined first gaming machine and conditionally performing a second movement of the movable member to associate an award indicia related to the second community-event outcome to a randomly determined second gaming machine. The step of conditionally performing the second movement of the movable member is performed in response to an input from at least one of the plurality of gaming machines. The method also includes awarding an award corresponding to the award indicia displayed to a respective one of the first and second gaming machines.

In accord with at least some aspects of the above method, the input may comprise a side bet input prior to the step of performing a first movement of the movable member. In accord with at least some aspects of the above method, the method may further comprise the acts of enabling the performing a second movement of the movable member by inputting a side bet into the gaming machine prior to of performing a first movement of the movable member and performing the second movement of the movable member only when the award indicia associated with the first community-event outcome is to a gaming machine other than the gaming machine associated with the act of enabling. The act of performing a second movement of the movable member may comprise moving the entire movable member relative to the plurality of gaming machines. The act of performing a second movement of the movable member may comprise moving the a portion of the movable member relative to the plurality of gaming machines. The act of performing a second movement of the movable member may comprise moving a substrate bearing the first award indicia and the second award indicia to display the second award indicia rather than the first award indicia.

According to yet another aspect of the invention, a method of conducting a wagering game on a plurality of gaming machines that are eligible to play a community-event comprising the acts of randomly determining a first community-event outcome, randomly determining a second community-event outcome, and transmitting the first and second community-event outcomes to a controller configured to control movement of a movable member. This method further includes the acts of performing a first movement of the movable member to associate a first award associated with the first community-event outcome with a randomly determined first gaming machine and performing, subsequent to the first movement, a second movement of the movable member to associate a second award associated with the second community-event outcome with a randomly determined second gaming machine. The method also includes awarding the first award and the second award to a respective one of the first gaming machine and the second gaming machine.

According to yet another aspect of the invention, a method of conducting a community-event on a plurality of gaming machines disposed adjacent a movable member comprises the acts of assigning at least one indicator to each of the plurality of gaming machines eligible to play the community-event, determining a community-event elimination result, and moving the movable member relative to the plurality of gaming machines to associate the community-event elimination result to an indicator. This method further includes the steps of eliminating the indicator from the set of indicators eligible to receive a community-event award responsive to the community-event elimination result, sequentially performing the determining, moving, and eliminating steps until a last indicator remains, and awarding a community-event award to a gaming machine associated with the last indicator.

According to yet another aspect of the invention, a method of conducting a community-event on a plurality of gaming machines disposed adjacent a movable member bearing an indicator comprises the steps of providing a movable member adjacent the plurality of gaming machines, assigning each eligible gaming machine at least one turn, and determining a community-event result for each turn assigned to each eligible gaming machine. The method also includes moving the movable member relative to the plurality of gaming machines to display the community-event result, associating the community-event result with a gaming machine indicated by the indicator, and sequentially performing the determining, moving, and associating steps until a community-event result has been determined for each of the turns assigned to the eligible gaming machines and associated with the eligible gaming machine having the turn for which the community-event result was determined.

In accord with at least some aspects of the above method, the above method of conducting a community-event may further comprise the act of awarding an award associated with each of the displayed community-event results to a respective one of the eligible gaming machines associated with the community-event result. In accord with at least some aspects of the above method, the above method of conducting a community-event may further comprise the acts of comparing the community-event results to determine which of the eligible gaming machines is associated with the greatest community-event result and awarding another community-event award to the eligible gaming machine associated with the greatest community-event result. In accord with other aspects of the above method, the method may further comprise the acts of assigning to each eligible gaming machine a plurality of turns, summing the community-event results for the plurality of turns assigned to each eligible gaming machine, and comparing the summed community-event results for the eligible gaming machines to determine the eligible gaming machine having the highest summed result. In accord with still other aspects of the above method, the method may further comprise the act of awarding an award associated with each community-event result to a respective one of the eligible gaming machines associated with the community-event result. Further thereto, the method may include the acts of comparing the community-event results and awarding another community-event award to the eligible gaming machine associated with the greatest community-event result.

In accord with yet additional aspects of at least some of the present concepts, a method of conducting a community-event on a plurality of linked gaming machines configured to play the community-event includes the acts of initiating a session of the community-event in which a plurality of linked gaming machines participate, determining a plurality of potential outcomes for the community-event, and permitting an input by at least one of the plurality of gaming machines to influence which of the potential outcomes will be realized by at least one of another of the plurality of linked gaming machines. In accord with aspects of the above method, the input by at least one of the plurality of gaming machines may comprise, for example, an outcome achieved on one of the gaming machines during play of a wagering game, an input by a player at one of the gaming machines, or an individual selection by a player at one of the gaming machines.

In accord with an additional aspect of at least some of the present concepts, a method of conducting a community-event on a plurality of linked gaming machines configured to play the community-event includes initiating a session of the community-event in which a plurality of linked gaming machines participate, determining a plurality of potential outcomes for the community-event, and mapping the plurality of potential outcomes relative to the plurality of linked gaming machines in response to input by at least one of the plurality of gaming machines. The input by at least one of the plurality of gaming machines may comprise, for example, an outcome achieved on one of the gaming machines during play of a wagering game, an input by a player at one of the gaming machines, or an individual selection by a player at one of the gaming machines.

In accord with another additional aspect of at least some of the present concepts, a method of conducting a community-event on a plurality of gaming machines includes the acts of initiating a session of the community-event in which a plurality of linked gaming machines participate, determining an outcome for the community-event, permitting an input by at least one of the plurality of gaming machines to override the outcome and cause an alternative outcome to be randomly determined, and awarding the alternative outcome to a respective one of the plurality of gaming machines.

In accord with still another additional aspect of at least some of the present concepts, a method of conducting a community-event on a plurality of linked gaming machines includes the acts of initiating a session of the community-event in which the plurality of linked gaming machines participate, determining an outcome for the community-event, the outcome being associated with the plurality of linked gaming machines, and permitting an input by at least one of the plurality of linked gaming machines to randomly modify at least one of an amount of the outcome and a distribution of the outcome. The input by at least one of the plurality of linked gaming machines may comprise, for example, an outcome achieved on one of the linked gaming machines during play of a wagering game, an input by a player at one of the linked gaming machines, or an individual selection by a player at one of the linked gaming machines.

Additional aspects of the invention will be apparent to those of ordinary skill in the art in view of the detailed description of various embodiments, which is made with reference to the drawings, a brief description of which is provided below.

DETAILED DESCRIPTION

Figure 1:
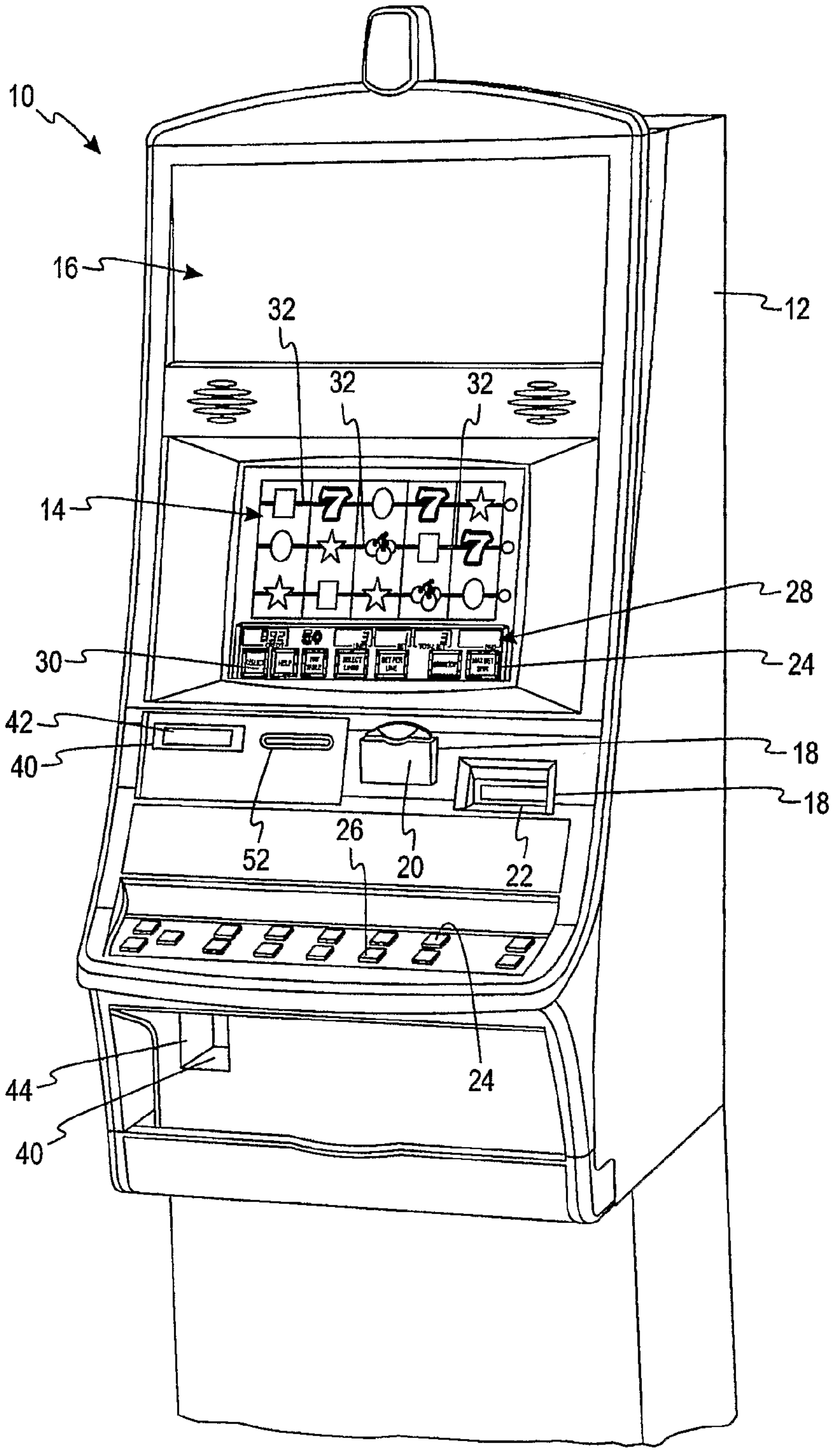
FIG. 1 is a perspective view of a gaming machine which may be utilized in accord with the present concepts.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1, a gaming machine 10 is used in gaming establishments such as casinos. With regard to the present invention, the gaming machine 10 may be any type of gaming machine and may have varying structures and methods of operation. For example, the gaming machine 10 may be an electromechanical gaming machine configured to play mechanical slots, or it may be an electronic gaming machine configured to play a video casino game, such as blackjack, slots, keno, poker, blackjack, roulette, etc.

The gaming machine 10 comprises a housing 12 and includes input devices, including a value input device 18 and a player input device 24. For output the gaming machine 10 includes a primary display 14 for displaying information about the basic wagering game. The primary display 14 can also display information about a bonus wagering game and a progressive wagering game. The gaming machine 10 may also include a secondary display 16 for displaying game events, game outcomes, and/or signage information. While these typical components found in the gaming machine 10 are described below, it should be understood that numerous other elements may exist and may be used in any number of combinations to create various forms of a gaming machine 10.

The value input device 18 may be provided in many forms, individually or in combination, and is preferably located on the front of the housing 12. The value input device 18 receives currency and/or credits that are inserted by a player. The value input device 18 may include a coin acceptor 20 for receiving coin currency (see FIG. 1). Alternatively, or in addition, the value input device 18 may include a bill acceptor 22 for receiving paper currency. Furthermore, the value input device 18 may include a ticket reader, or barcode scanner, for reading information stored on a credit ticket, a card, or other tangible portable credit storage device. The credit ticket or card may also authorize access to a central account, which can transfer money to the gaming machine 10.

The player input device 24 comprises a plurality of push buttons 26 on a button panel for operating the gaming machine 10. In addition, or alternatively, the player input device 24 may comprise a touch screen 28 mounted by adhesive, tape, or the like over the primary display 14 and/or secondary display 16. The touch screen 28 contains soft touch keys 30 denoted by graphics on the underlying primary display 14 and used to operate the gaming machine 10. The touch screen 28 provides players with an alternative method of input. A player enables a desired function either by touching the touch screen 28 at an appropriate touch key 30 or by pressing an appropriate push button 26 on the button panel. The touch keys 30 may be used to implement the same functions as push buttons 26. Alternatively, the push buttons 26 may provide inputs for one aspect of the operating the game, while the touch keys 30 may allow for input needed for another aspect of the game.

The various components of the gaming machine 10 may be connected directly to, or contained within, the housing 12, as seen in FIG. 1, or may be located outboard of the housing 12 and connected to the housing 12 via a variety of different wired or wireless connection methods. Thus, the gaming machine 10 comprises these components whether housed in the housing 12, or outboard of the housing 12 and connected remotely.

The operation of the basic wagering game is displayed to the player on the primary display 14. The primary display 14 can also display the bonus game associated with the basic wagering game. The primary display 14 may take the form of a cathode ray tube (CRT), a high resolution LCD, a plasma display, an LED, or any other type of display suitable for use in the gaming machine 10. As shown, the primary display 14 includes the touch screen 28 overlaying the entire monitor (or a portion thereof) to allow players to make game-related selections. Alternatively, the primary display 14 of the gaming machine 10 may include a number of mechanical reels to display the outcome in visual association with at least one payline 32. In the illustrated embodiment, the gaming machine 10 is an "upright" version in which the primary display 14 is oriented vertically relative to the player. Alternatively, the gaming machine may be a "slant-top" version in which the primary display 14 is slanted at about a thirty-degree angle toward the player of the gaming machine 10.

A player begins play of the basic wagering game by making a wager via the value input device 18 of the gaming machine 10. A player can select play by using the player input device 24, via the buttons 26 or the touch screen keys 30. The basic game consists of a plurality of symbols arranged in an array, and includes at least one payline 32 that indicates one or more outcomes of the basic game. Such outcomes are randomly selected in response to the wagering input by the player. At least one of the plurality of randomly selected outcomes may be a start-bonus outcome, which can include any variations of symbols or symbol combinations triggering a bonus game.

In some embodiments, the gaming machine 10 may also include a player information reader 52 that allows for identification of a player by reading a card with information indicating his or her true identity. The player information reader 52 is shown in FIG. 1 as a card reader, but may take on many forms including a ticket reader, bar code scanner, RFID transceiver or computer readable storage medium interface. Currently, identification is generally used by casinos for rewarding certain players with complimentary services or special offers. For example, a player may be enrolled in the gaming establishment's loyalty club and may be awarded certain complimentary services as that player collects points in his or her player-tracking account. The player inserts his or her card into the player information reader 52, which allows the casino's computers to register that player's wagering at the gaming machine 10. The gaming machine 10 may use the secondary display 16 or other dedicated player-tracking display for providing the player with information about his or her account or other player-specific information. Also, in some embodiments, the information reader 52 may be used to restore game assets that the player achieved and saved during a previous game session.

Figure 2:
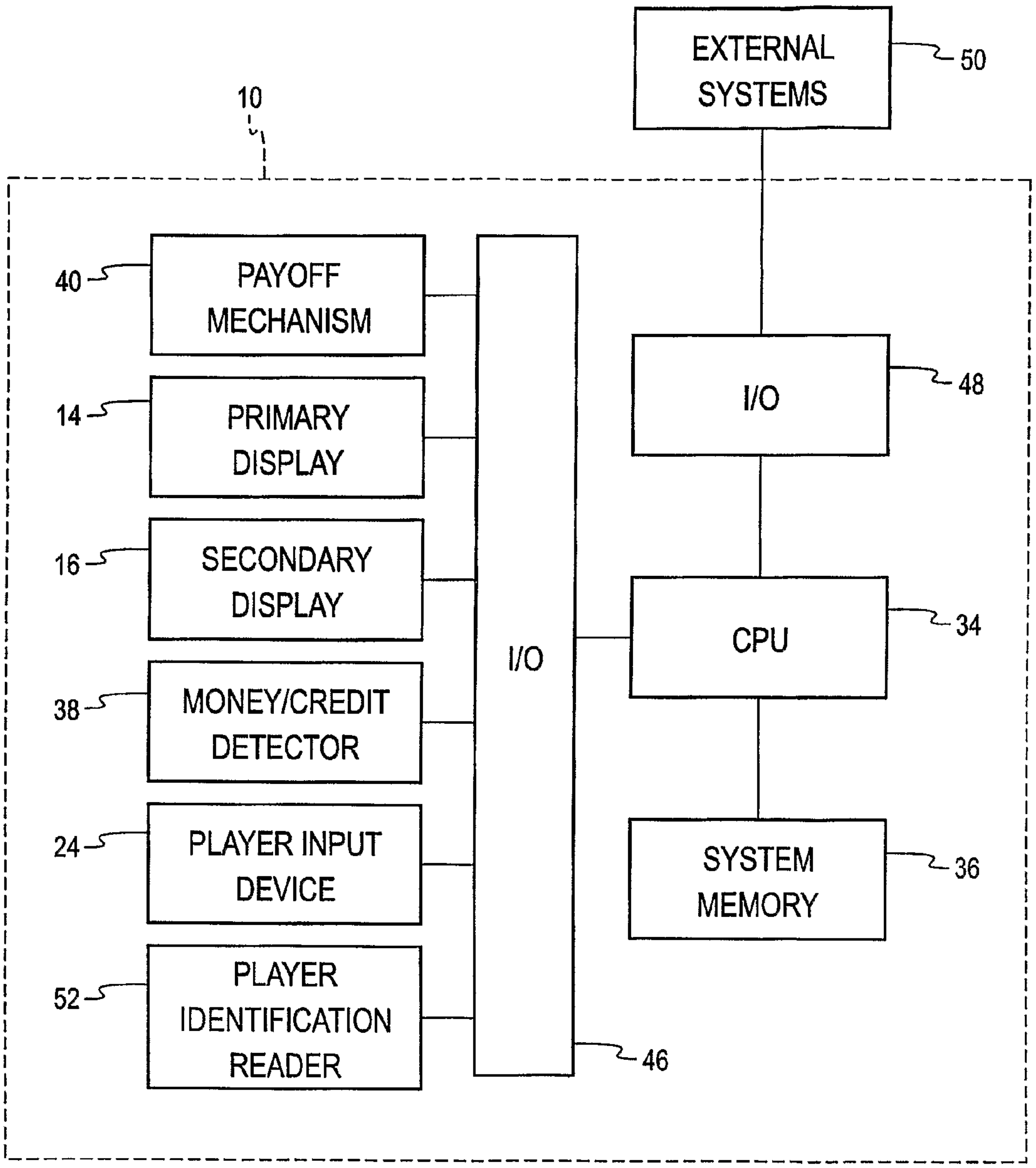
FIG. 2 is a block diagram of a control system suitable for operating gaming machines utilized in accord with the present concepts.

Turning now to FIG. 2, the various components of the gaming machine 10 are controlled by a central processing unit (CPU) 34, also referred to herein as a controller or processor (such as a microcontroller or microprocessor). To provide gaming functions, the controller 34 executes one or more game programs stored in a computer readable storage medium, in the form of memory 36. The controller 34 performs the random selection (using a random number generator (RNG)) of an outcome from the plurality of possible outcomes of the wagering game. Alternatively, the random event may be determined at a remote controller. The remote controller may use either an RNG or pooling scheme for its central determination of a game outcome. It should be appreciated that the controller 34 may include one or more microprocessors, including but not limited to a master processor, a slave processor, and a secondary or parallel processor.

The controller 34 is also coupled to the system memory 36 and a money/credit detector 38. The system memory 36 may comprise a volatile memory (e.g., a random-access memory (RAM)) and a non-volatile memory (e.g., an EEPROM). The system memory 36 may include multiple RAM and multiple program memories. The money/credit detector 38 signals the processor that money and/or credits have been input via the value input device 18. Preferably, these components are located within the housing 12 of the gaming machine 10. However, as explained above, these components may be located outboard of the housing 12 and connected to the remainder of the components of the gaming machine 10 via a variety of different wired or wireless connection methods.

As seen in FIG. 2, the controller 34 is also connected to, and controls, the primary display 14, the player input device 24, and a payoff mechanism 40. The payoff mechanism 40 is operable in response to instructions from the controller 34 to award a payoff to the player in response to certain winning outcomes that might occur in the basic game or the bonus game(s). The payoff may be provided in the form of points, bills, tickets, coupons, cards, etcetera. For example, in FIG. 1, the payoff mechanism 40 includes both a ticket printer 42 and a coin outlet 44. However, any of a variety of payoff mechanisms 40 well known in the art may be implemented, including cards, coins, tickets, smartcards, cash, etcetera. The payoff amounts distributed by the payoff mechanism 40 are determined by one or more pay tables stored in the system memory 36.

Communications between the controller 34 and both the peripheral components of the gaming machine 10 and external systems 50 occur through input/output (I/O) circuits 46, 48. More specifically, the controller 34 controls and receives inputs from the peripheral components of the gaming machine 10 through the input/output circuits 46. Further, the controller 34 communicates with the external systems 50 via the I/O circuits 48 and a communication path (e.g., serial, parallel, IR, RC, 10bT, etc.). The external systems 50 may include a gaming network, other gaming machines, a gaming server, communications hardware (and/or software and/or firmware), a controller, a service, or a variety of other interfaced systems or components. Although the I/O circuits 46, 48 may be shown as a single block, it should be appreciated that each of the I/O circuits 46, 48 may include a number of different types of I/O circuits.

Controller 34, as used herein, comprises any combination of hardware, software, and/or firmware that may be disposed or resident inside and/or outside of the gaming machine 10 that may communicate with and/or control the transfer of data between the gaming machine 10 and a bus, another computer, processor, or device and/or a service and/or a network. The controller 34 may comprise one or more controllers or processors. In FIG. 2, the controller 34 in the gaming machine 10 is depicted as comprising a CPU, but the controller 34 may alternatively comprise a CPU in combination with other components, such as the I/O circuits 46, 48 and the system memory 36.

I. Gaming System Comprising Movable Member

Figure 4:
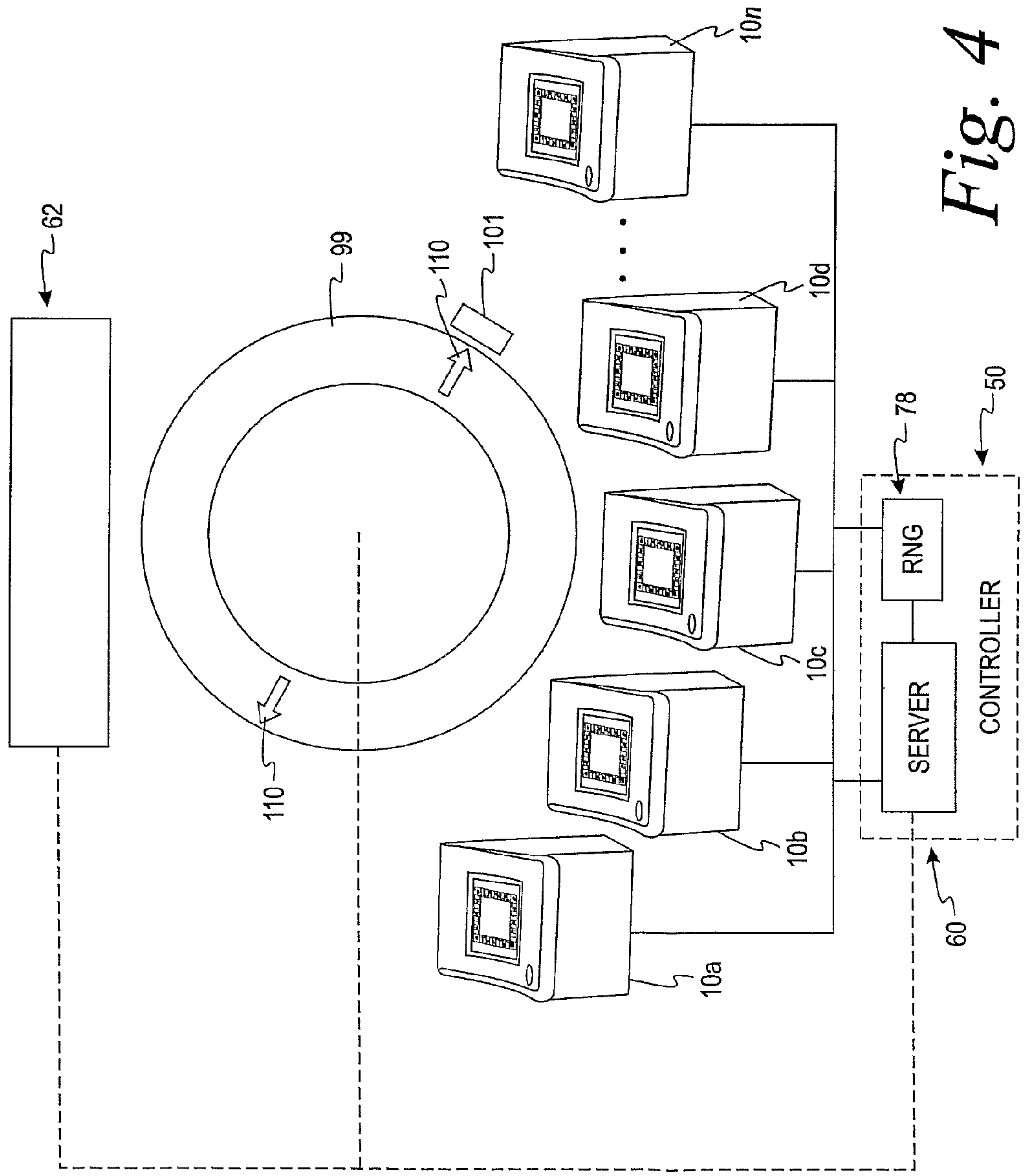
FIG. 4 is a top down representation of a gaming system for conducting a community-event according to at least some aspects of the present concepts.

In FIG. 4, one embodiment of a gaming system in accord with the present concepts may include a plurality of gaming machines 10*a-n*, where n may be any integer, a server 60, a movable member 99 disposed adjacent the gaming machines that is viewable by players at gaming machines 10*a-n*. An optional overhead sign 62 is also provided. In accord with at least some embodiments, the server 60 is coupled to the gaming machines 10*a-n* and may reside within a selected one or more of the gaming machines or may be disposed externally to the gaming machines. In such embodiments, the server 60 is configured to perform functions including, but not limited to, coordinating signals between the plurality of gaming machines 10*a-n*, triggering the community-event, and determining one or more community-event outcome. Alternatively or additionally, these and other functions may be embodied more generically within external system 50 or a controller associated therewith, a controller 34, a service, or any other device or system capable of executing such functions. Server 60 may also comprise a part of controller 34.

The gaming system represented in FIGS. 3-6 herein is used for conducting a community-event, which in the examples presented herein relate to a "Monopoly® Big Event" game (hereinafter "Big Event Game"), in which a plurality of gaming machines 10*a-n* (e.g., gaming machines 10*a*, 10*b*, . . . 10*n*, wherein n is any integer) share community-event outcomes. The community-event can be, for example, a community bonus game. The community-event can be any event in which a plurality of gaming machines are configured so that players may participate in a game with other players and is not limited to board games or to the Big Event Game example provided herein.

The community-event, as the term is used herein, encompasses not only simultaneous play by a plurality of participating players, but also includes sequential or turn-based play by a plurality of participating players. Moreover, the community-event does not require parity between players and the level of participation or promise of an award does not have to be equal for all participants. In at least some embodiments, for example, players may have different roles in the community-event game or players may have different award potentials based on satisfaction of different eligibility requirements. The concepts discussed hereinafter with respect to the Big Event Game apply equally to any community-event in which a plurality of gaming machines are linked together so that players may participate in a game with other players wherein at least two players participate collectively and/or wherein at least two players collectively benefit from an outcome of the community-event game.

The term community-event game, as used herein, relates to any game in which a competitive element, collaborative element, and/or shared experience/outcome is present. In one example, the community-event game may comprise a game in which one player participates in the game and a plurality of players share in the award, in at least some respect. In another example, the community-event game may also comprise a game in which a plurality of players play the game, but only one player wins an award. In yet another example, the community-event game may even include a game in which one player plays the game for the benefit of another player or players and does not himself or herself share in the award. Neither these examples of various aspects of community-event games, nor other examples provided herein, are to be construed as limiting the overall concept, defined above.

Further, the community-event may, in accord with the present concepts, comprise a single community-event or may comprise a plurality of different community-events. In embodiments wherein a plurality of different community-events are provided, the particular community-event to be initiated may be determined, for example, randomly, sequentially, or in accord with a schedule. Thus, for embodiments in which each of the different community-events is triggered in accord with a schedule by a time-based trigger, a first community-event could be initiated at the top of every hour (e.g., 4:00 p.m., 5:00 p.m., etc.) and a second community-event could be initiated each hour at the half-hour (e.g., 4:30 p.m., 5:30 p.m., etc.). An embodiment having three different community-event games could sequentially present a different one of the three community-events every twenty minutes (e.g., 1, 2, 3, 1, 2, 3, etc.) and an embodiment having six different community-event games could sequentially present a different one of the three community-events every ten minutes. In such multiple-community-event embodiments, players who may have accrued or obtained eligibility for a community-event may optionally be permitted to select which of the plurality of community gaming events in which they would prefer to participate. For example, in response to an invitation to participate in a community-event game, the player of gaming machine 10*b* may decide to wait until the next community-event game, because that player prefers the upcoming community-event game over the currently initiated community-event game.

The Big Event Game is initiated, in at least some embodiments, by an event within one of the gaming machines (e.g., 10*a*), shown generally in FIGS. 3-6, or arising from games played thereon. For example, the Big Event Game can be triggered when a player achieves a particular set of symbols on the basic game. In another example, the Big Event Game can be triggered at random intervals. For example, the Big Event Game can be triggered if a selected random number is within a predetermined range. In at least some embodiments, a gaming machine may initiate the Big Event Game.

When the community-event (e.g., Big Event Game) has been triggered, whatever the source of the trigger (e.g., gaming machine 10, controller 34, external system(s) 50, etc.), all eligible ones of the gaming machines 10*a*-*n* are notified and invited to participate. In at least one embodiment, eligibility may be determined by the use of a time eligibility model wherein a time slice or predetermined amount of time is awarded to the player, or associated with the gaming machine, for playing a time-based bonus game. A time-slice counter is correspondingly used to increment and/or decrement time slices for increasing and/or decreasing the time that the player is eligible to play the time-based bonus game or community-event game. Separately from the players and gaming machines, a random number generator, or other manner of triggering device, determines whether the bonus game is triggered on a periodic basis (e.g., every second or fraction of a second). If a gaming machine shows a current balance of available time in the time-slice counter when the bonus game is triggered, then the gaming machine would be eligible to play the time-based bonus game or community-event game.

If a player accepts the invitation to participate in the community-event, then the Big Event Game is initiated on his or her gaming machine and it is displayed for allowing the player to observe the outcome(s) of the Big Event Game. The outcome(s) of the Big Event Game (i.e., or other community-event game) is also preferably displayed on an overhead display or signage 62 and is represented and/or displayed on a movable member 99, such as shown in FIG. 4.

In operation, when a community-event is triggered, a RNG which may comprise a part of the controller 34 or external systems 50 (e.g., server, service, game manager, controller, RNG service, client, and/or BIG Event Client Manager, etc.), such as shown in FIG. 4, dictates one or more of the outcomes in the community-event. These outcomes are distributed by external systems distributes the received random outcomes to all of the eligible and participating gaming machines 10*a*-*n*. A controller associated with the external systems 50, such as represented in FIG. 4, and/or a gaming machine controller 34 controls movement of movable member 99 by outputting instructions to a driving member of the movable member corresponding to the random outcome(s) which are calculated to move the movable member 99 in association with the random outcome(s). In at least some embodiments, the components, systems, or constituent parts (e.g., hardware, software, firmware) comprising the external systems 50 may reside in, execute on, and/or be carried by structures internal or external to any of the gaming machines 10*a*-*n*.

Figure 5A:
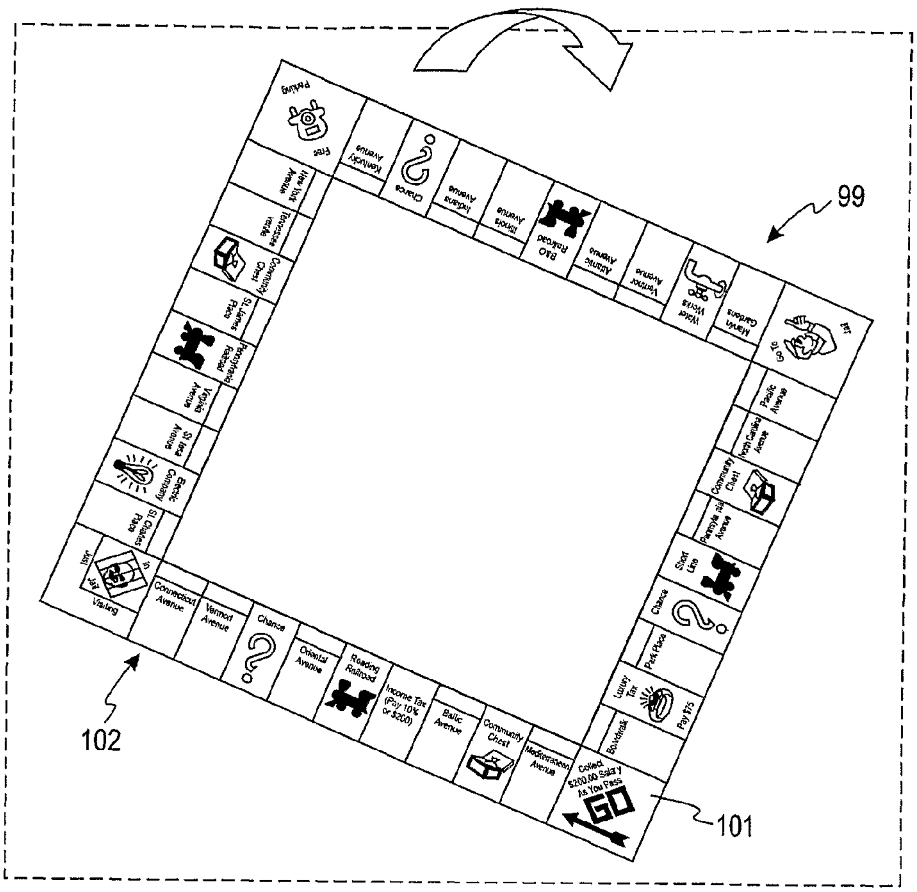
FIGS. 5*a*-(*e*) are representations of various embodiments of gaming system for conducting a community-event in accord with at least some aspects of the present concepts.
Figure 5A:
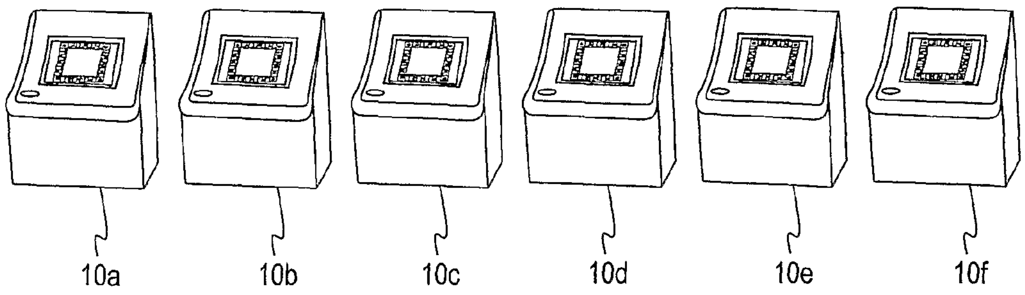
Figure 5B:
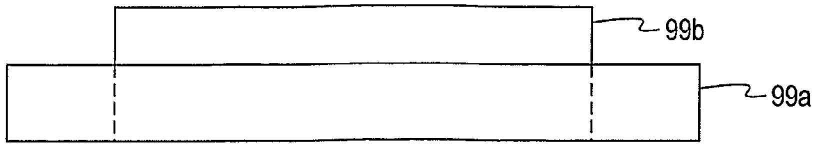
Figure 5C:
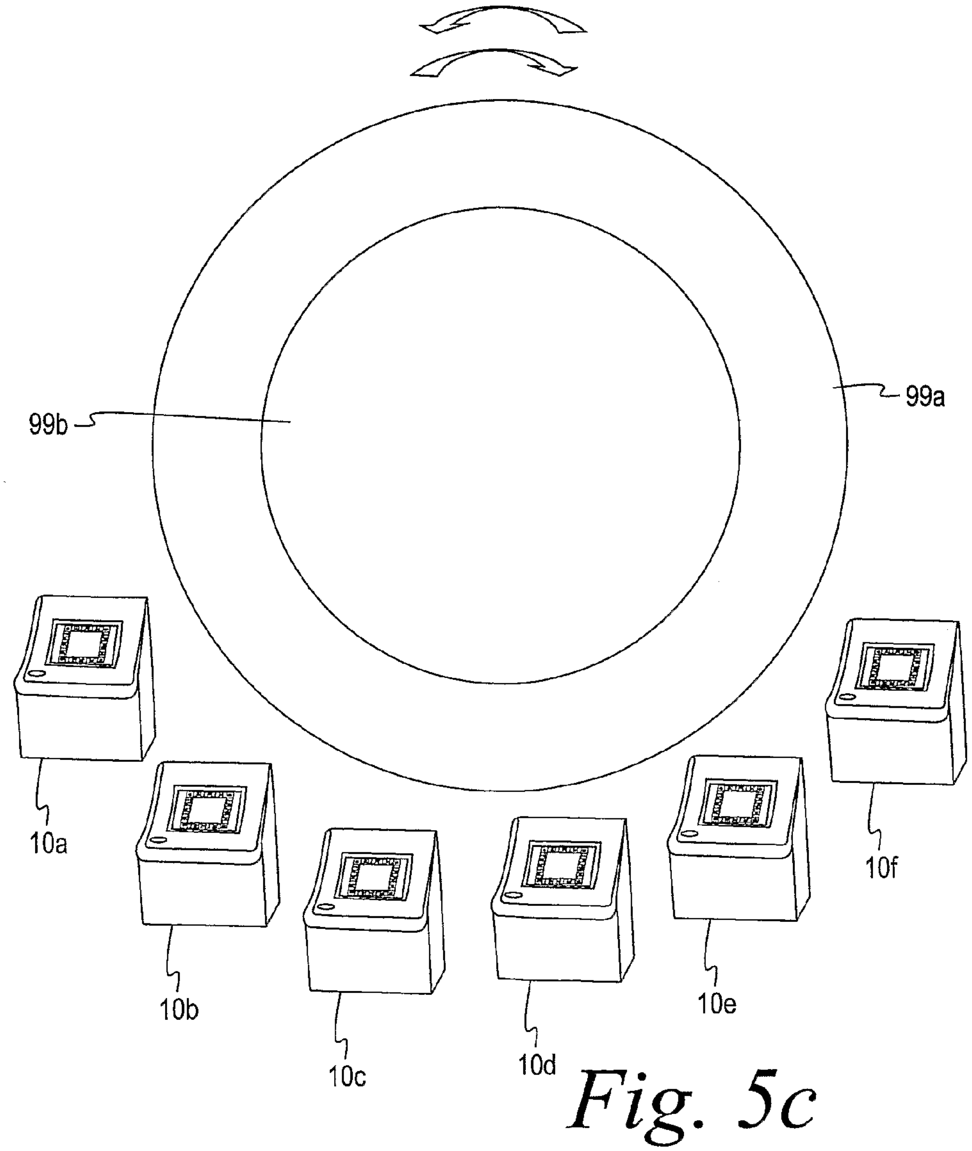
Figure 5D:
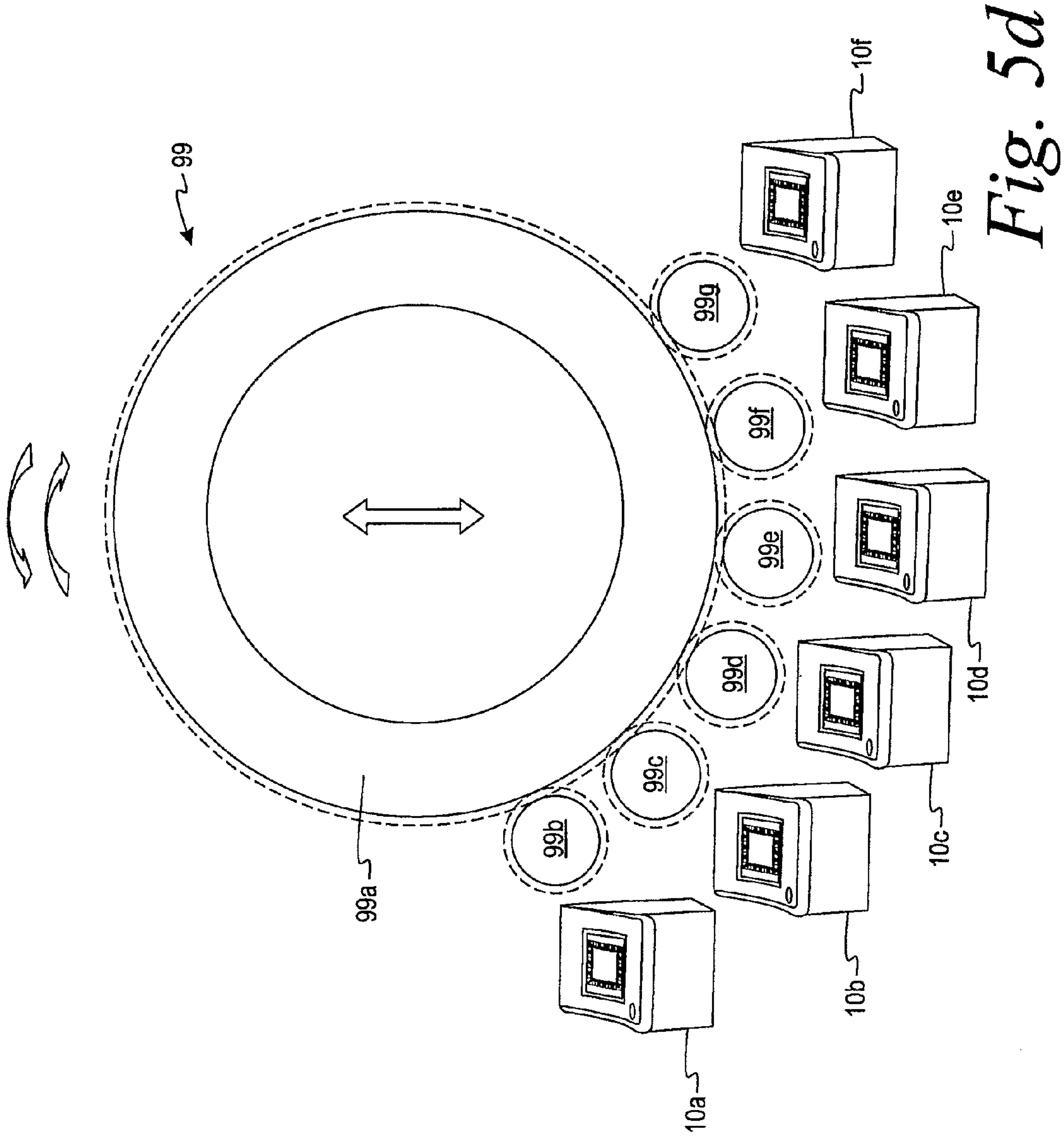
Figure 5E:
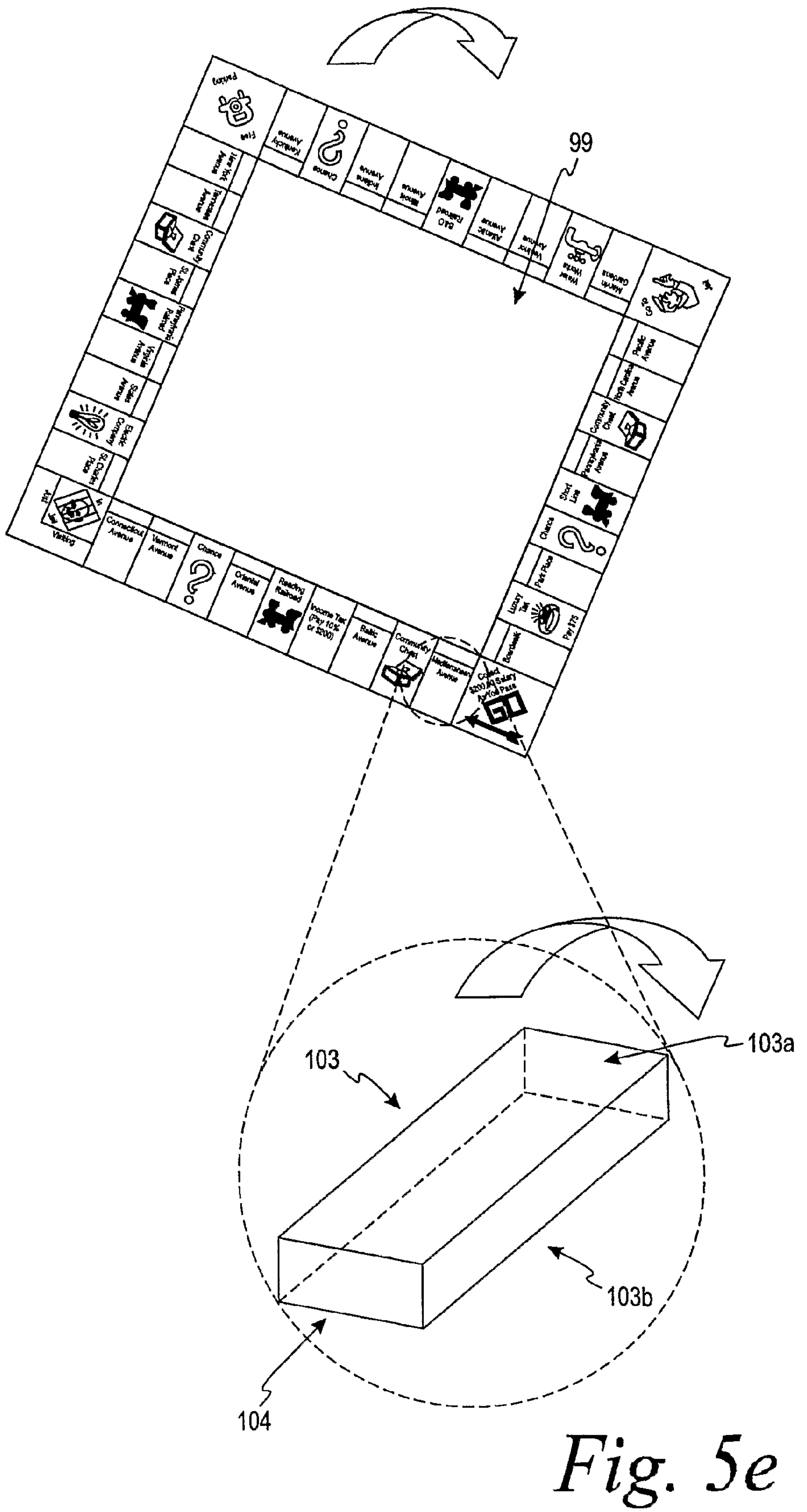
Figure 6:
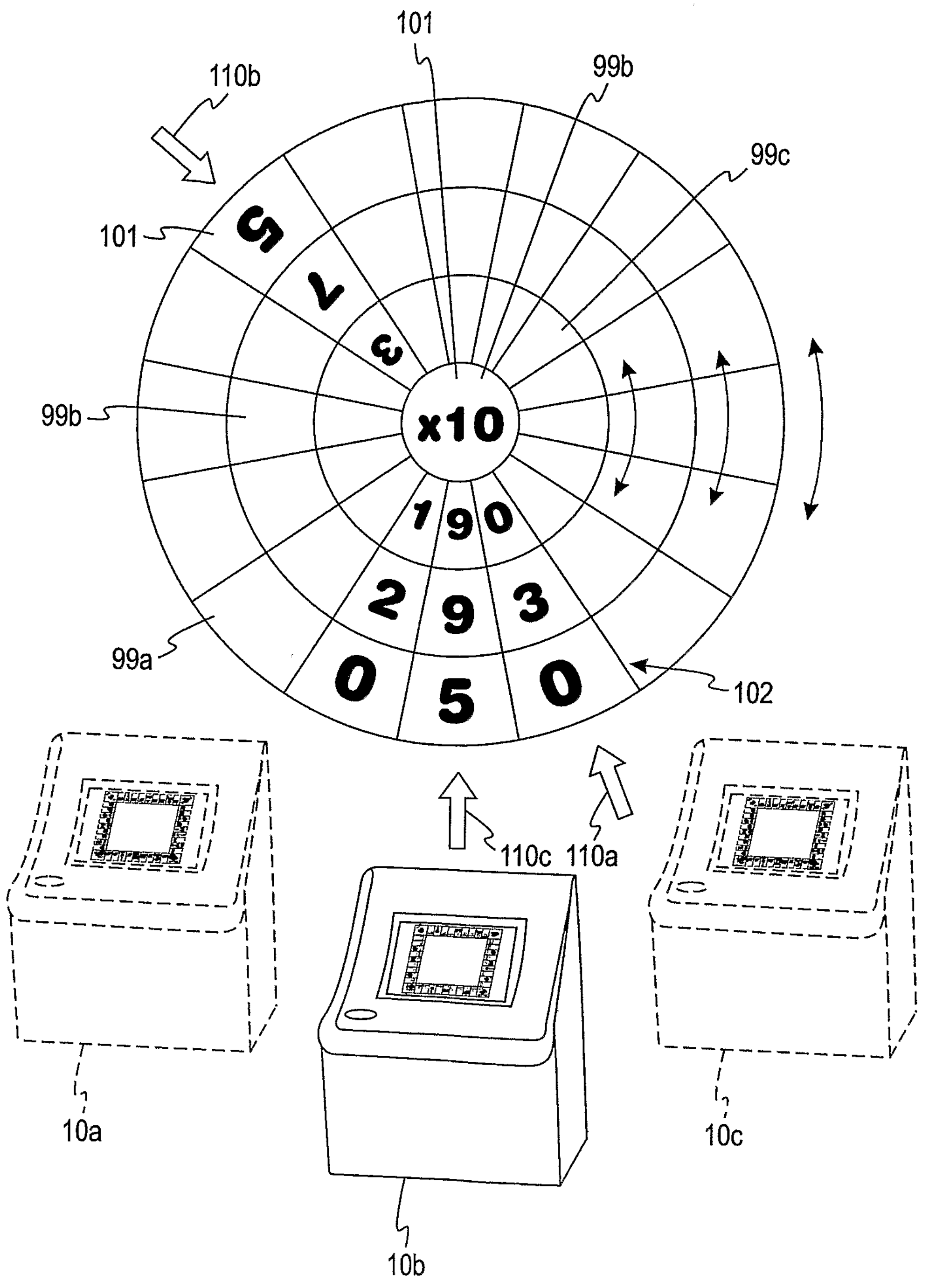
FIG. 6 is a representation of another aspect of a gaming system for conducting a community-event in accord with the present concepts.

In at least one aspect of at least some embodiments, a first gaming machine 10*a*, such as shown in any of FIGS. 3-6, can provide random number generation for a first outcome of a community-event (e.g., the Big Event Game) and a second gaming machine 10*b*, also shown in FIGS. 3-6, can provide random number generation for a second outcome therein. Thus, the random number generation associated with the community-event can be provided by one or more of the participating gaming machines (e.g., 10*a*, 10*b*). The outcomes are transmitted to the participating gaming machines and are reflected on the movable member 99 (e.g., a movable Monopoly®-themed board or reel and/or a game piece moving relative thereto), such as shown in FIG. 6. In one aspect, for example, a first outcome can be a first roll of the dice and a second outcome can be a subsequent roll of the dice, each roll of the dice being represented, for example, by movement of the movable member relative to a selected point or datum. The datum may be fixed, or may be tied to a selected variable, such a gaming machine having a spin or turn, or a gaming machine being designated to receive a certain award (e.g., an indicator on the movable member pointing toward a winning gaming machine).

In at least some embodiments, participation in the community-event is voluntary and a player may simply opt out of the community-event when a query is directed to the player asking if he or she, being eligible, would like to participate. The eligibility of the gaming machine to participate in the community-event may be performed by controller 34 or the external systems 50, which may comprise a number of constituent members including, but not limited to, a server 60, RNG 78, and or controller, such as shown in FIG. 4. In at least some other embodiments, participation in the community-event is automatic, provided the gaming machine meets predetermined eligibility requirements at the time that the community-event game is triggered and/or initiated.

Optionally, one or more of the randomly selected outcomes within the community-event can comprise sub-outcomes. For example, while playing the community Monopoly® board game, a player may receive an award if an outcome of the game allows a player's game piece to move past the starting point of the game twice. To receive the award, the player will generally require a plurality of dice rolls (i.e., a plurality of sub-outcomes) to move across the board. Each dice roll requires a randomly generated number, which can be provided from any designated RNG (e.g., 78). The shared outcome of the game (e.g., moving a game piece across the Monopoly® game-board as a function of the randomly selected outcome indicated by the dice) is displayed on one or more of a corresponding primary display 14 and secondary display 16 of the gaming machines 10*a*, 10*b*. In addition, the shared outcome is displayed or otherwise represented on movable member 99 and is optionally displayed on an overhead display or signage 62. The movable member may comprise, in one aspect, a physical game piece configured to move across the Monopoly® game-board responsive to the randomly outcome.

FIG. 4 shows a top-down representation of a gaming system for conducting a community-event including gaming machines 10*a*-10*f* arranged adjacent a movable member 99 and an optional signage 62. Thus, each player is able to observe the movable member 99 and the signage 62 during the community-event. Movable member 99 or, more particularly, a driving device (e.g., motor, belt, etc.) connected thereto, is controlled by the external systems 50 or controller 34.

In at least some embodiments, each of the gaming machines 10*a-n*, such as those represented in FIG. 2, includes a separate controller 34 comprising an RNG for coordinating a basic wagering game that is typically played locally and individually at the gaming machine 10. However, one or more of the gaming machines 10*a-n* may have a controller 34 and associated RNG used for determining the outcomes of the basic game and for determining a randomly selected outcome in the community-event that is shared by several of the gaming machines 10*a-n*. In such embodiments, at least one controller 34 has an RNG service for controlling the community-event outcome of at least one neighboring gaming machine. In other embodiments, a controller 34 or external systems 50 (e.g., server 60, controller, communication hardware, software, firmware, etc.) may be coupled to a memory 36 which includes data (e.g., a look up table that associates a plurality of randomly selected bonus-game outcomes corresponding to a plurality of randomly selected numbers) for determining a random bonus-game outcome.

The functions of triggering a session of the community-event, sharing information related to the community-event, and determining outcomes of the community-event can vary dynamically and/or randomly over time among the plurality of gaming machines 10*a*-10*n* shown generally in FIGS. 3-6 and, optionally, the external systems 50 (see FIGS. 2 and 4). For example, an initiator machine that triggers a session of the community-event can vary from one session of the community-event to another session of the community-event. As such, assuming that in a first session of the community-event the initiator machine is the first gaming machine 10*a*, in a second session of the community-event the initiator machine can be the first gaming machine 10*a*, a second gaming machine 10*b*, or an external system 50. The type of triggering can be an outcome achieved during the wagering game, or it can be a random event unrelated to the wagering games being played at the gaming machines 10*a*-10*n* (e.g., selection of a random number within a predetermined range).

II. Embodiments of Movable Member

In at least some embodiments of the present concepts, a gaming system for playing a wagering game includes a plurality of gaming machines 10*a-n* configured to play a wagering game and to participate in a community-event. In accord with these embodiments, a movable member 99 is disposed substantially adjacent to said plurality of gaming machines 10*a-n* and is configured to move relative to the plurality of gaming machines during a community-event. During a community-event, the movable member 99 is moved relative to the plurality of gaming machines 10*a-n* to reveal at least one community-event outcome for the community-event.

Any of the embodiments and aspects of the movable member 99 described herein may be used separately or in combination. The concepts presented by way of example with respect to any one of the embodiments described herein are considered to apply equally to all other embodiments and aspects described herein.

In accord with each of the gaming system concepts disclosed herein and as discussed in more detail below, the movable member 99 may comprise award indicia 101 including static award indicia 102 (e.g., a fixed award indicia) and/or a dynamic award indicia 103 (e.g., a dynamic, mutable, or changeable award indicia). Typically, but not necessarily, the award indicia 101 will comprise a monetary award figure (e.g., $100, $250, $1000, ¥100,000, etc.) or other defined prize or benefit. The award indicia 101 may comprise, for example, a visual representation of a game square on a Monopoly® game board, such as shown in FIG. 5*a*, with or without an explicit indication of value provided in association therewith. In such aspect, a look-up table or other correlating information would be provided to link the award indicia to the actual award. In other aspects, such as shown in FIG. 5*e*, the award indicia 101 may comprise numerals, without an explicit reference to currency. Typically, the instructions for a particular game, or even custom, define the award indicia 101. The award indicia 101 may alternatively be provided adjacent the movable member 99, displayed on signage 62, displayed on the gaming machine displays 14, 16, or the like, rather than being disposed on the movable member.

In accord with the concepts herein, the movable member 99 serves to indicate a beneficiary or beneficiaries of the community-event outcome. The movable member 99 performs this function by moving, relative to any pointers or indicators 110 (hereinafter "indicator 110"), award indicia 101, or other movable members disposed on or in relation thereto, to indicate a beneficiary or beneficiaries of the community-event outcome and/or an award to be awarded to such beneficiary or beneficiaries of the community-event outcome. It is presently preferred that the community-event outcome provide either: (1) a shared outcome wherein a plurality of participants share in the overall award conferred by the community-event outcome or receive individual awards related to such community-event outcome or (2) individual outcomes in a shared environment (e.g., multiple players on a Monopoly® game board having game pieces landing on different game squares).

The community-event may, in accord with the present concepts, comprise a single community-event or may comprise a plurality of different community-events. In embodiments wherein a plurality of different community-events are provided, the particular community-event to be initiated may be determined, for example, randomly, sequentially, or in accord with a schedule. Thus, for embodiments in which each of the different community-events is triggered in accord with a schedule by a time-based trigger, a first community-event could be initiated at the top of every hour (e.g., 4:00 p.m., 5:00 p.m., etc.) and a second community-event could be initiated each hour at the half-hour (e.g., 4:30 p.m., 5:30 p.m., etc.). An embodiment having three different community-event games could sequentially present a different one of the three community-events every twenty minutes (e.g., 1, 2, 3, 1, 2, 3, etc.) and an embodiment having six different community-event games could sequentially present a different one of the three community-events every ten minutes. In such multiple-community-event embodiments, players who may have accrued or obtained eligibility for a community-event may optionally be permitted to select which of the plurality of community gaming events in which they would prefer to participate. For example, in response to an invitation to participate in a community-event game, the player of gaming machine 10*b* may decide to wait until the next community-event game, because that player prefers the upcoming community-event game over the currently initiated community-event game.

A. Movable Member Comprising Single Member

Figure 3:
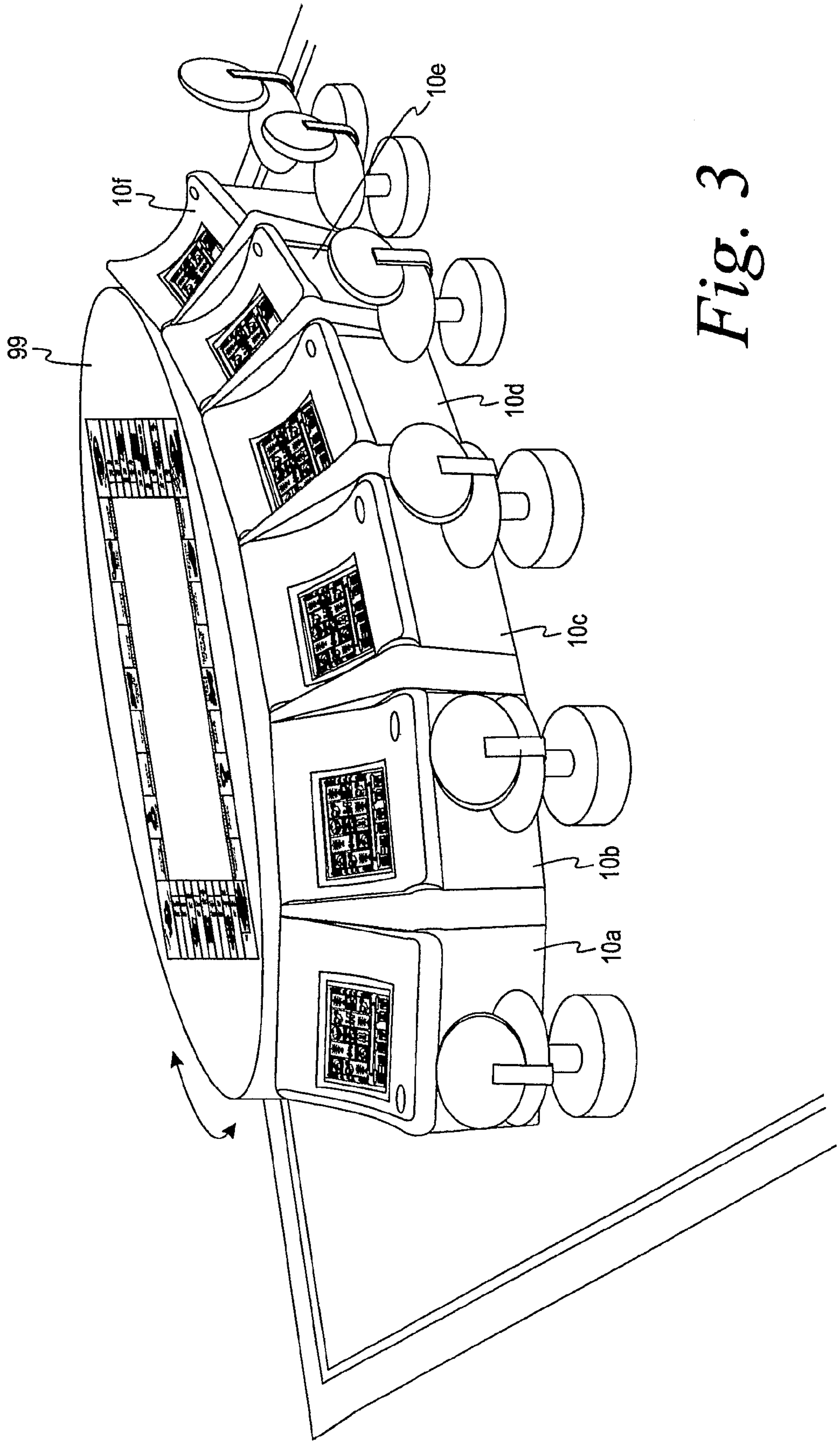
FIG. 3 is a perspective representation of a gaming system for conducting a community-event according to at least some aspects of the present concepts.

In various embodiments, such as is generally represented in FIG. 5*a*, the movable member 99 may comprise a game board (e.g., a Monopoly® game board), mechanism, wheel, reel, actuator, and/or gear configured to rotate about or move with respect to (e.g., translation) one or more axes, which could include a horizontal axis, an inclined axis, and/or a vertical axis. In the example of FIG. 5*a*, the movable member 99 comprises a game board configured to rotate about a vertical axis (i.e., in the horizontal plane).

Where the movable member 99 is configured to additionally translate along a second axis, such axis is preferably, but not necessarily, substantially perpendicular to the first axis. For example, the movable member 99 may be a game board, such as shown in FIG. 3, configured to rotate about a first (vertical) axis. The movable member may also be configured to translate laterally (e.g., forward, backward, left, right) and/or up and down along a vertical axis. Moreover, rotation may occur along a number of axes. For example, a movable member 99 (e.g., a game board) may be connected to an arm pivotable relative to a horizontal plane, to permit tilting of the movable member relative to the gaming machines 10*a-n* and may also be rotatable about a normal axis with respect to such arm. Accordingly, in one example of such movement, a plurality of separate groupings of gaming machines 10*a-n* may be disposed about the movable member 99 in some desired arrangement (e.g., 2 groupings of 4 gaming machines on opposite sides of the movable member or 4 groupings of 3 gaming machines in 4 quadrants, etc.). If one of the groups of gaming machines 10*a-n* is designated to play the community-event game, the movable member may be translated toward such group, tilted with respect to such group, and/or rotated, as desired.

The movable member 99 may optionally bear an award indicia 101 or a plurality of award indicia relating to a community-event. In various examples, the award indicia 101 may comprise numerical and/or textual values or indications of awards. These award indicia 101 may be disposed, for example, on a top surface and/or side surfaces of the movable member 99. In the example of a movable member 99 comprising a game board (e.g., a Monopoly® game board), the award indicia 101 could consist of the monetary value indicated on each of the various game squares, as may be potentially or optionally modified by "ownership" of related game squares and/or the presence of houses or hotels.

The movable member may bear one or more indicators 110 configured to point at an award indicia 101 external to the movable member, such as adjacent the movable member or a display placed adjacent thereto. In another aspect, the movable member may bear one or more indicators 110 configured to point at a one or more gaming machines 10*a-n*. Conversely, the movable member may award indicia 101 and the indicator (s) 110 disposed external to the movable member 99, such as represented in FIG. 6. One or more indicators 110 may be associated with any of the gaming machines 10*a-n*.

As noted above, a first gaming machine (e.g., 10*a*) of a plurality of gaming machines (e.g., 10*a* . . . 10*n*) may be configured to send a community-event triggering signal to a server (e.g., server 60, external systems 50, etc.) for initiating the community-event in response to the first gaming machine achieving a community-event award or trigger outcome in the wagering game played thereupon. Alternatively, the community-event may be randomly triggered by a random number generator or by a time-based trigger, although any triggering method or device may be used in accord with the present concepts. In response to the initiation of the community-event by the first gaming machine (e.g., 10*a*), at least one additional gaming machine (e.g., a second gaming machine 10*b*) receives a community-event invitation. Any gaming machine receiving a community-event invitation is permitted to accept or reject the invitation, expressly or by default.

B. Movable Member Comprising Multiple Members

The movable member 99 shown in FIG. 5*a* may also comprise a plurality of such constituent members (i.e., 99*a-n*, where n is any integer), having a plurality of game boards, mechanisms, wheels, reels, actuators, and/or gears, or combinations thereof, configured to rotate about or move with respect to one or more axes.

FIGS. 5*b-c* show a side view and a top view of a movable member 99 comprising a first movable member 99*a* (e.g., a first tier reel) and a second movable member 99*b* (e.g., a second tier wheel), each of which rotates about or moves with respect to a horizontal axis. In the example shown in FIGS. 5*b-c*, the second movable member 99*b* is vertically movable from a first position substantially level with the first movable member, which is indicated by the dashed lines in FIG. 5*b*, to a second raised position, as shown in FIG. 5*b*.

Other aspects of the gaming system comprising multiple movable members are shown and described below with respect to FIGS. 5*d*, 5*e*, and 6.

C. Movable Member Comprising Geared Member(s)

FIG. 5*d* shows a movable member 99 comprising a plurality of gears 99*a-g*, which may be intermeshed to form any manner of gearing or gear trains. The plurality of gears 99*a-g* noted in the above example could also comprise one or move driving gears and/or driven gears which may be moved transversely, laterally, or in some other direction to selectively move into and out of engagement with the remainder of the gear train.

In an example of a movable member 99 comprising a plurality of intermeshed gears, such as shown in FIG. 5*d*, one of the gears, or a number of the gears, may have one or more award indicia(s) 101 and/or indicators 110 disposed thereon. In accord with a predetermined rotation of a driving gear or pinion (e.g., 99*a*, 99*b*) by a controller (e.g., a controller associated with the external systems 50), a selected award indicia (not shown in FIG. 5*d*) may be displayed adjacent to a designated indicator 110 (not shown in FIG. 5*d*), such as is shown in FIG. 6, wherein either the award indicia or the indicator may be stationary with respect to the gear(s).

For example, in an embodiment such as that shown in FIG. 5*d*, wherein a gear 99*b-g* is disposed in front of a respective one of the gaming machines 10*a-f*, each of these gears could bear on an upper surface thereof a plurality of award indicia 101 (not shown). When a driving gear (e.g., 99*a-g*) is selected and rotated by the associated drive means (not shown), such as an AC or DC motor, each of the intermeshed gears would rotate opposite to the rotation of the driving gear in accord with the respective gear ratios between the driving gear and the driven gear. One or more indicators 110 could be provided in front of each gaming machine 10*a-f*, such as shown in FIG. 6, so that when the rotation of the gears 99*a-n* is stopped in accord with an instruction from the controller, one award indicia 101 on one of the gears will point to an indicator 110 of an associated one of the gaming machines to indicate a result of the community-event.

D. Movable Member Comprising Movable Sub-part(s) and/or Dynamic Display

In various embodiments in accord with the present concepts, the movable member 99, movable members 99*a-n* (see, e.g., FIGS. 5*b-c*), and/or subparts thereof (see, e.g., 103, FIG. 5*e*) may be configured to alternatively or additionally translate and/or rotate along a second axis and/or optionally a third axis or additional axes. As used herein, the term movable member 99 generally includes one or more movable members 99*a-n*, as well as one or more subparts thereof, in any combination.

As noted above, in at least some embodiments of the gaming system in accord with the present concepts, a dynamic award indicia 103 (e.g., a dynamic, mutable, or changeable award indicia) may be provided, such as is shown in FIG. 5*e*. The dynamic award indicia 103 may comprise, for example, a physical or electronic display configured to display an award indicia, such as a video display. In the example of FIG. 5*e*, the dynamic award indicia 103 may comprise a rotating mechanical substrate 104 having a plurality of faces or surfaces, each surface bearing one or more award indicia (e.g., 103*a*, 103*b*, etc.).

For example, the rotating mechanical substrate 104 may comprise a 3-sided, 4-sided, 5-sided, or 6-sided geometric shape closed at least along a viewing area (e.g., a box which may be open at the supported end(s)). Each surface of the rotating mechanical substrate 104 preferably bears a different award indicia 101. Thus, in at least some embodiments of the present concepts, the stopping of the movable member 99 does not necessary indicate a final outcome of the community game and the dynamic display 103 provides yet an additional degree of variability and control of the community-event game. For example, the movable member 99 may stop to display a community-event result adjacent a pointer of a selected gaming machine (e.g., 10*a*), such that the player at the gaming machine knows that he or she has won an award, but the player will not know how much he or she has won until the dynamic display 103 shows the final community-event outcome.

III. Methods of Conducting Community-Event Game

The gaming system in accord with the present concepts permits a wide variety of methods of conducting a wagering game and/or community-event on a plurality of gaming machines, as discussed by way of illustrative examples below.

Figure 7:
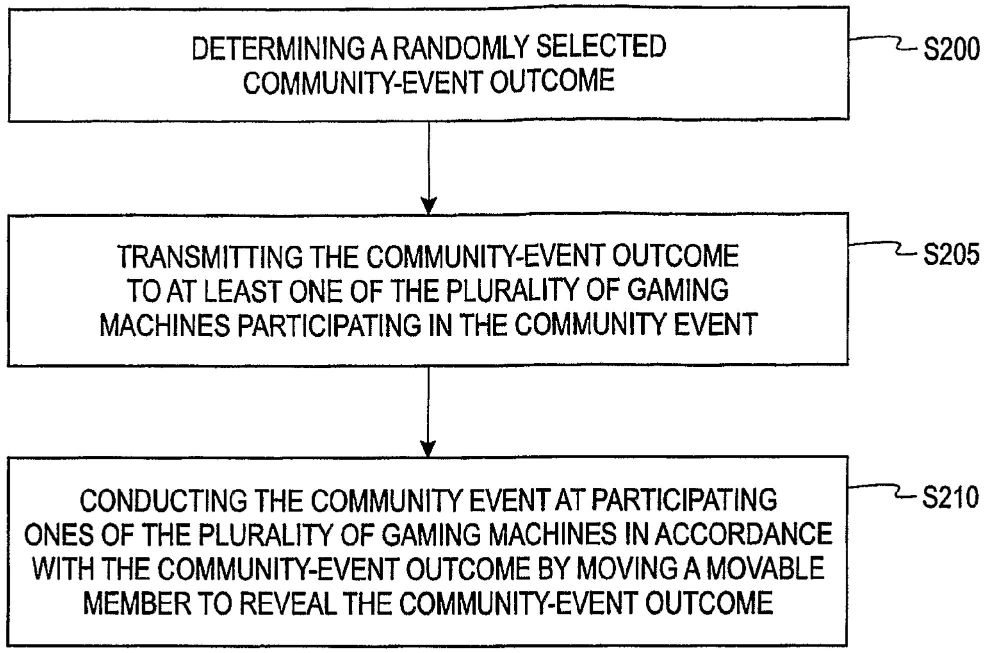
FIG. 7 is a flowchart showing at least some aspects of a method of conducting a community-event in accord with a first embodiment of the present concepts.

A. Method Including Transmitting Community-Event Outcome to at Least One Gaming Machine and Moving Movable Member to Reveal Community-Event Outcome One basic method of conducting a wagering game and community-event on a plurality of gaming machines 10*a*-*n* eligible to play a community-event is shown in FIG. 7. This method includes the steps of determining a randomly selected community-event outcome (step S200) and transmitting the community-event outcome to at least one of the plurality of gaming machines participating in the community-event (step S205). This method also includes the step of conducting the community-event at participating ones of the plurality of gaming machines in accord with the community-event outcome (step S210) by moving a movable member 99 to reveal the community-event outcome. In various other aspects of this method, the determining step S200 includes a step of determining the randomly selected community-event outcome within one of the plurality of gaming machines 10*a*-*n*. This may be accomplished through the use of, for example, a random-number generator within one of the gaming machines.

The determining step S200 may optionally include aggregating a randomly selected first sub-outcome and a randomly selected second sub-outcome to obtain a community-event outcome. For example, a first sub-outcome may be generated by a random number generator (RNG) in a first gaming machine (e.g., 10*a*) and a second sub-outcome may be generated by a RNG in a second gaming machine (e.g., 10*b*). These outcomes may then be combined in accord with some function to obtain a community-event outcome. For example, the first sub-outcome may represent a movement of a first movable member 99*a*, such as a movement of a tens multiplier (e.g., ×10, ×100, ×1,000, ×10,000, ×100,000), in a configuration similar to that shown in FIG. 5*e*, to display a result corresponding to the first sub-outcome. The second sub-outcome may, in turn, represent a movement of a second movable member 99*b* or subpart of the first movable member 99*a*, such as movement of a leading numeral or operand for the multiplier (e.g., 1, 2, 3 . . . 10). The combination of the first sub-outcome and the second sub-outcome thus yield the community-event-outcome (e.g., 6×10,000=60,000).

The trigger or triggering event used to initiate the community-event may generally comprise any trigger or triggering event. In one embodiment, the determining step S200 is preceded by a random-number generating step, which produces a result triggering the community-event. In one aspect, this random-number generating step may be entirely unrelated to an outcome of the wagering game being played at any one of the plurality of gaming machines 10*a*-*n*. For example, the community-event may be randomly triggered or may be triggered by a time-based trigger. A time-based trigger may comprise a trigger in which the trigger is activated upon the lapse of a predetermined period of time (e.g., every 4 minutes, every 30 minutes, etc.) or a trigger configured for activation at any randomly selected time within a specified range of times (e.g., at any time within a one hour window appearing every 2 hours, every 4 hours, etc.).

In some embodiments, the step of conducting the community-event S210 may include displaying the community-event on a display, such as signage 62 and/or movable member 99 (see, e.g., FIG. 4) viewable by the players at the gaming machines 10*a*-*n*. As previously noted, the movable member 99 may comprise a movable member of essentially any size, shape, and design including, but not limited to, a rotatable game board, mechanism, wheel, reel, actuator, and/or a gear and/or plural movable members and combinations thereof, such as represented in FIGS. 3-6.

The movement of the movable member 99 may comprise a rotational and/or translational component along one or more axes under the influence of one or more driving members and/or force transmission members. In some aspects, the moving of the movable member (step S210) includes rotating the movable member 99 about a first axis and may also or alternatively include translating and/or rotating at least a portion of the movable member 99 along a second axis substantially perpendicular to the first axis. One example of this is shown in FIGS. 5*b*-*c*, wherein the movable member 99*b* is moved to an upwardly disposed position relative to movable member 99*a*. Another example of this is shown in FIG. 5*e*, wherein a portion of movable member 99 (i.e., rotating mechanical substrate 104) is shown to rotate with respect to the movable member.

The step of moving of the movable member 99 to reveal the community-event outcome in step S210 may comprise positioning an award indicia 101 borne by the movable member 99 adjacent an indicator 110, such as shown in FIG. 6, which may be a stationary indicator disposed adjacent respective ones of the plurality of gaming machines 10*a*-*n* (e.g., 110*a*, 110*c*) or disposed adjacent the movable member (e.g., 10*b*). The step of moving the movable member 99 may also or alternatively comprise positioning an indicator disposed on a first movable member 99*a* adjacent an award indicia disposed on a second movable member 99*b*. This latter concept encompasses not only a singular movable member 99 which may have subparts (e.g., rotating mechanical substrate 104) movable in relation thereto, but encompasses a plurality of separate movable members (e.g., 99*a*, 99*b*, 99*c*) working in unison to reveal the community-event outcome through a rotating and/or translating movement, such as is generally provided in FIG. 5*d*.

With any of the plurality of movable members 99, the movable member may bear one or more award indicia 101 or display(s) configured to display an award indicia, such as generally shown in FIG. 5*d*. Additionally or alternatively, award indicia 101 may be displayed, or displays for award indicia provided, adjacent one or more movable members. As to the award indicia 101, which may be provided either on the movable member 99 or provided adjacent one or more movable members, such award indicia may comprise a dynamic award indicia 103, such as represented in FIG. 5*e*, configured to change from one displayed award indicia (e.g., on side 103*a*) to another displayed award indicia (e.g., on side 103*b*) upon receipt of a command signal from a controller (e.g., 34, 50). In one aspect, shown in FIG. 5*e*, the dynamic award indicia 103 may comprise a rotating mechanical substrate 104 having a plurality of surfaces, each of the surfaces potentially bearing at least one award indicia 101. Accordingly, the moving of the movable member to reveal the community-event outcome in step S210 comprises, in this embodiment, rotating the rotating mechanical substrate 104, as shown by an arrow in FIG. 5*e*, to reveal a selected one of the surfaces (e.g., 103*a*, 103*b*). A dynamic award indicia 103 (e.g., a video display) may be provided and the act of revealing the community-event outcome could further entail displaying an award indicia corresponding to the community-event outcome on the video display.

Figure 8:
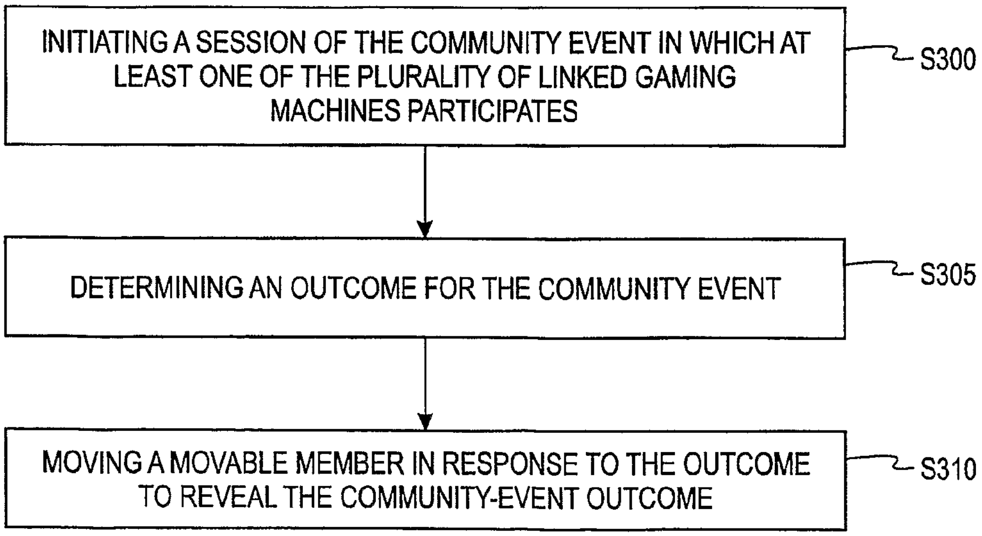
FIG. 8 is a flowchart showing at least some aspects of a method of conducting a community-event in accord with a second embodiment of the present concepts.

B. Method Including Initiating Session of Community-Event Game and Moving Movable Member to Reveal Community-Event Outcome As shown in FIG. 8., a method of conducting a wagering game having a community-event on a plurality of linked gaming machines 10*a-n* may include the steps of initiating a session of the community-event in which at least one of the plurality of linked gaming machines participates (step S300) and determining an outcome for the community-event (step S305). This method also includes the step of moving a movable member 99 to reveal the community-event outcome (step S310).

The outcome determined in step S305 could benefit a single one of the plurality of linked gaming machines 10*a-n* or could, preferably, benefit more than one of the players/gaming machines. For example, the outcome determined in step S305 could be shared, either in whole (i.e., duplicate award) or in part (i.e., divided award), with another one of the plurality of linked gaming machines or with a group of the other gaming machines. To illustrate aspects of these concepts, in a roulette game two of the players in the community-event game may put a bet on the same game square and, if the ball or representation thereof lands on that game square, each player gets the benefit of the other player's bet (e.g., the outcome for each may be doubled). In other words, the placement of multiple bets on the same game square increases (e.g., as a multiplier) a potential outcome of each player's bet. To further illustrate aspects of these concepts, in a Monopoly® implementation, multiple hotels may be placed on a single game square by a plurality of players. For example, three players may each place one hotel on a game square. If any player lands on that game square, every player in the community-event game may then win the aggregate amount of the property value with three hotels or, alternatively, only the three players having placed the hotels on the game square may win the award in the aggregate amount.

In one aspect, the determining an outcome step S305 may comprise determining, inter alia, a first community-event outcome and a second community-event outcome, wherein the first and second community-event outcomes are different from one another. A first gaming machine (e.g., 10*a*) of the plurality of linked gaming machines 10*a-n* would be the beneficiary of the first outcome and a second gaming machine (e.g., 10*b*) would be the beneficiary of the second outcome.

Figure 9:
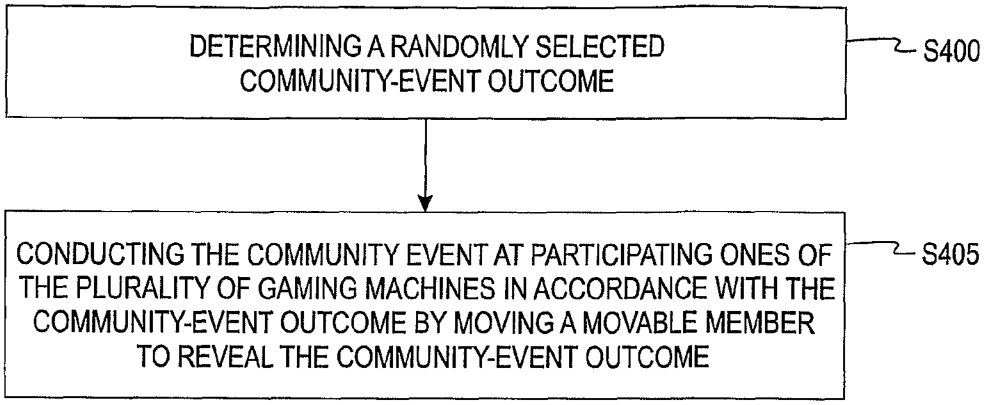
FIG. 9 is a flowchart showing at least some aspects of a method of conducting a community-event in accord with a third embodiment of the present concepts.

C. Method Including Conducting Community-Event Game at Participating Gaming Machines and Moving Movable Member to Reveal Community-Event Outcome FIG. 9 shows another method of conducting a wagering game on a plurality of gaming machines that are eligible to play a community-event, which includes the steps of determining a randomly selected community-event outcome (step S400) and conducting the community-event at participating ones of said plurality of gaming machines in accord with the community-event outcome (step S405). The conducting step S405 further comprises moving a movable member 99 to reveal the community-event outcome. The moving of the movable member 99 may be effected by, for example, the transmission of a signal from controller (e.g., 34, 50) to a drive system for the movable member, the signal providing the necessary input to the drive system to cause a predetermined movement of the movable member.

In accord with at least this embodiment, the steps of determining the randomly selected community-event outcome (step S400) and of conducting the community-event (step S405) need not be contiguous or substantially contemporaneous and may occur at different times.

Figure 10:
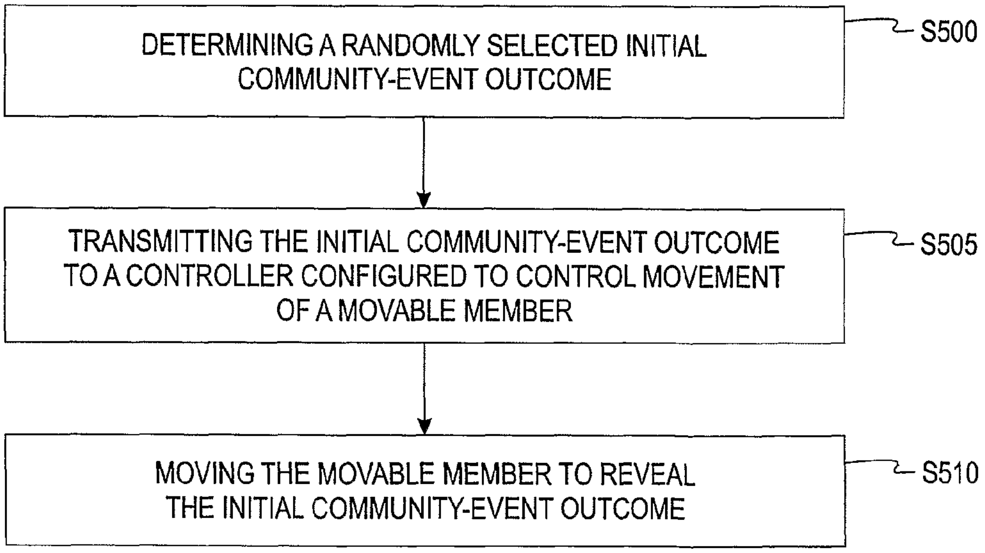
FIG. 10 is a flowchart showing at least some aspects of a method of conducting a community-event in accord with a fourth embodiment of the present concepts.

D. Method Including Moving Movable Member to Reveal Initial Community-Event Outcome and Enabling a Nudge Feature FIG. 10 shows another embodiment of a method of conducting a wagering game on a plurality of gaming machines that are eligible to play a community-event. In this embodiment, the method includes the steps of determining a randomly selected initial community-event outcome (step S500) and transmitting the initial community-event outcome to a controller (e.g., 34, 50) configured to control movement of a movable member 99 (step S505). The method also includes the step of moving the movable member 99 to reveal the initial community-event outcome (step S510).

This embodiment may also include a step of enabling a nudge feature (step S515) in response to a side bet or a plurality of side bets being placed prior to one or more of the determining step S500, transmitting step (S505), and moving step (S510). Correspondingly, if no side bet is placed, as noted above, the initial community-event outcome may be set to default as the final community-event outcome. However, should the nudge feature be enabled in step S515, the method may include the additional step S520 of nudging the movable member 99 through a randomly determined additional movement following the reveal of the initial community-event outcome to reveal a final community-event outcome. For example, the controller 34 or external systems 50 may randomly determine an additional movement of the movable member 99 a first direction or a second direction for each of the side bets placed on the gaming machines 10*a-n* and sum such additional movements to yield an aggregate additional movement of the movable member. Once the aggregate additional movement has been determined, the method would include the step of nudging the movable member 99 through the aggregate additional movement in a selected direction to reveal a final community-event outcome.

The nudging of the movable member 99 may be entirely determined by the controller 34 or external systems 50, or may selectively be influenced by one or more of the players or gaming machines. For example, the randomly determined additional movement may be determined by the controller 34 or external systems 50, but the players (e.g., one or more players who had input an appropriate side bet and/or satisfied another criteria) may be allowed to influence a direction in which the movable member 99 moves. Alternatively, the nudging may require active participation on the part of one or more players or groups of players who would, for example, manipulate designated gaming machine controls singly or in cooperation with other members of a group to influence the nudge feature. For example, the player or group of players manipulating the designated gaming machine controls at the fastest rate in a predetermined period of time might be deemed the "winner" of the contest and would thus be permitted to influence the direction in which the movable member 99 moves. Thus, the nudge feature in step S520 lends itself to both competitive and cooperative community-event participation.

Figure 11:
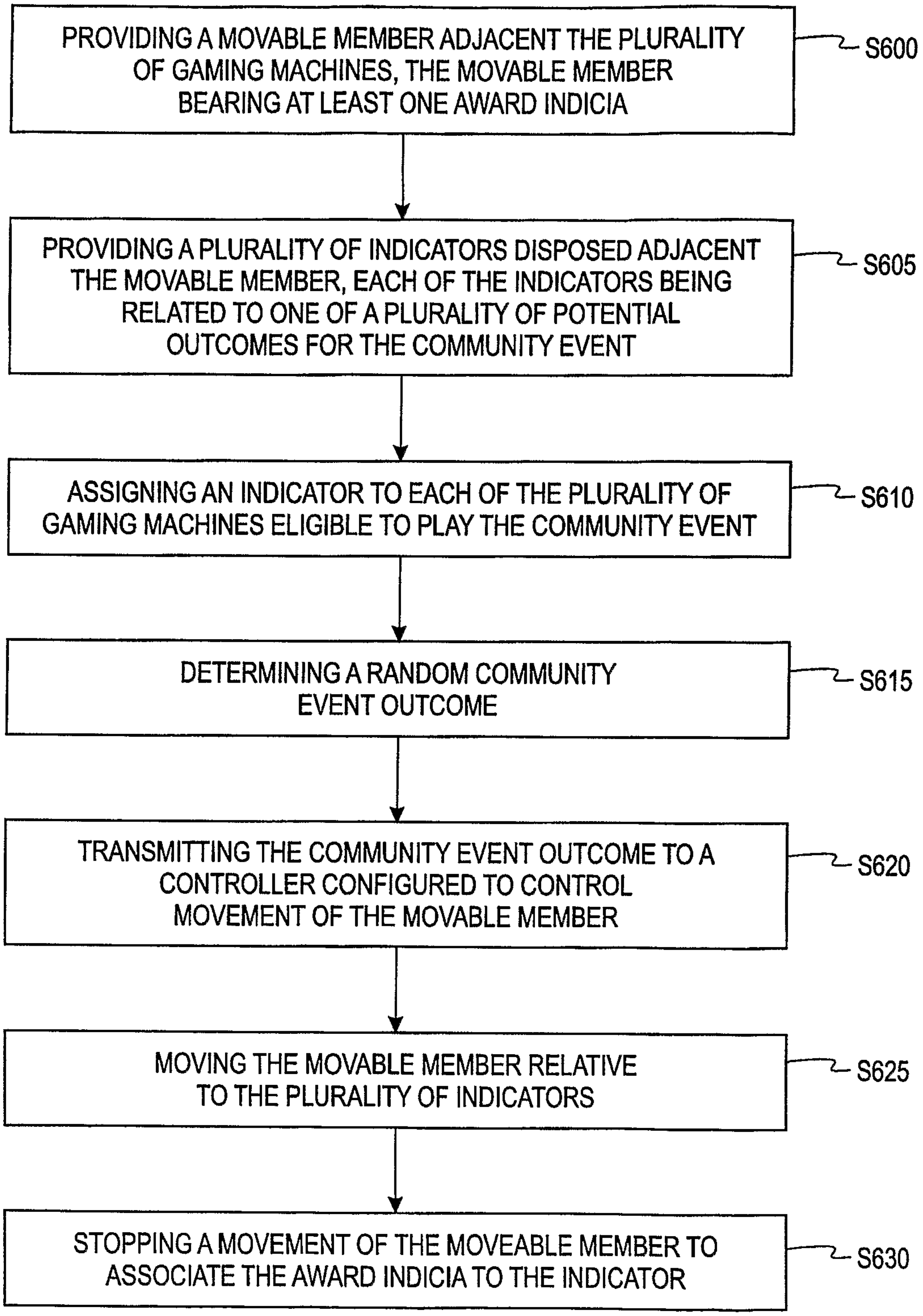
FIG. 11 is a flowchart showing at least some aspects of a method of conducting a community-event in accord with a fifth embodiment of the present concepts.

E. Method Including Providing Movable Member Award Indicia and Indicators Assigned to Respective Gaming Machines Adjacent Thereto FIG. 11 shows yet another embodiment of a method of conducting a community-event on a plurality of gaming machines 10*a-n* disposed adjacent a movable member 99. The embodiment of FIG. 11 includes the step of providing a movable member 99 bearing at least one award indicia adjacent the plurality of gaming machines 10*a-n* (step S600). The method also includes the step of providing a plurality of indicators 110 disposed adjacent the movable member 99, each of the indicators being related to one of a plurality of potential outcomes for the community-event (step S605). In step S605, the indicators 110 may be disposed about the movable member 99 in any arrangement and may, for example, circumscribe or partially circumscribe the movable member. In at least some embodiments, the movable member 99 bears at least one award indicia, but alternative embodiments may reverse the positions of the award indicia 101 and the indicators 110.

The method of FIG. 11 also includes the steps of assigning an indicator 110 to each of the plurality of gaming machines 10*a-n* eligible to play the community-event (step S610) and determining a random community-event outcome from a plurality of potential outcomes for the community-event (step S615).

In one potential example of game play, represented in FIG. 6, one indicator may be automatically assigned to each of the eligible gaming machines 10*a-n* and each player may be given the option to obtain one or more additional indicators, such as by through a minimum initial wager, subsequent wager, or side wager. Thus, in some aspects of the method, the assigning of an indicator 110 in step S610 may optionally require the input of a side bet, at least as to the assignment of additional indicators in excess of a pre-selected base number of indicator. In response to such side bet, at least one additional indicator is associated with the player inputting the side bet or gaming machine accepting the side bet, as appropriate. The indicator(s) 110 may be disposed adjacent and assigned to a respective one of the gaming machines 10*a-n* or may be selectively disposed by the player at any available indicator position adjacent the movable member 99. Players may also be permitted to place multiple indicator(s) in a single indicator position to effectively act as a multiplier or may be permitted to place an indicator or indicators in the same position as another player's indicator(s). The indicator 110 need not be adjacent, or even near, the gaming machine to which it is assigned.

Once the community-event outcome is determined in step S615, the outcome is transmitted to a controller 34 or external systems 50 configured to control movement of the movable member 99 (step S620). The movable member is then moved relative to the gaming machines 10*a-n* in step S625. Then, in step S630, the movement of the movable member 99 is stopped to dispose the movable member award indicia 101 adjacent an indicator or indicators 110 and associate the award to the indicator and therefore the gaming machine. It at least some embodiments, the gaming machines 10*a-n* may themselves serve as the indicators (e.g., an award on the movable member 99 is positioned directly in front of a winning gaming machine).

In some aspects of a method of conducting a community-event in accord with the present concepts, the community-event may include the optional steps of additionally awarding the award indicated to any gaming machine having an indicator 110 disposed in some relation to the indicated award. For example, an award may be awarded to an indicator positioned on an opposite side of the movable member 99 than the indicator associated with the award indicia 101. In other aspects, an award may be awarded to an indicator positioned at some pre-selected angle (e.g., n° offset from center of movable member 99, where n is any integer between or including −360° and +360°) or relation (e.g., any indicator within a predetermined or randomly determined number of positions of the winning indicator; any indicator of a color or theme common to the winning indicator, etc.) to the indicator associated with the award indicia 101.

The community-event may include the optional steps of additionally awarding to any of the eligible gaming machines any of a variety of awards lesser in value than that displayed by a community-event winning award indicia 101. For example, for a movable member 99 having fixed award indicia 101, the award indicia may comprise a plurality of substantially low value award indicia, a smaller number of medium value award indicia, and a high value award indicia (i.e., community-event award, progressive award, etc.). When a high value award indicia is associated with indicator 110, the remainder of the indicators associated with other players or gaming machines would be disposed adjacent to an associated one of the low value award indicia or medium value award indicia and receive a corresponding award. Thus, a big winner of the community-event game might win an award of one order of magnitude (e.g., in the thousands of dollars), wherein the remaining participants in the community-event game might win awards of another order of magnitude (e.g., in the hundreds of dollars).

In some aspects of the present concepts disclosed herein, such as are generally represented in FIGS. 7-15, players are provided the opportunity to obtain additional indicators 110 to improve their odds of winning a community-event or of maximizing their outcome in the community-event. For example, players could be provided an opportunity or opportunities to accumulate indicators 110 during the basic wagering game or during bonus games or other non-community-event games associated with the basic wagering game. Additionally or alternatively, additional indicators 110 may be accumulated by other devices including, but not limited to, input of a predetermined wager, purchase at a set or a variable purchase price, a predetermined rate or period of game play, devise, or participation in a player rewards program. Indicators 110 may also be banked (i.e., saved for play or use at a future time) or traded-up for a lesser number of indicators having a higher value. For example, five lower value indicators could be traded-up for a single high value indicator, which might qualify the player associated therewith to a higher level of awards.

In one aspect, a player might only be eligible to receive an optimal outcome in the community-event if the player possesses and plays such a high value indicator. FIG. 6 shows, for example, a movable member 99 having three tiers 99*a-c* of rotating, coaxial reels. In the position shown, a controller 34 or a controller associated with the external system(s) 50 controls movement of the movable member 99 and has randomly rotated the respective ones of the movable members 99_a-c_ to the positions shown. Focusing only on gaming machine 10_b_, gaming machine 10_b_ has accumulated a low value indicator 110_a_, a medium value indicator 110_b_, and a high value indicator 110_c_.

In the example shown in FIG. 6, the low value indicator 10_a_ might qualify the gaming terminal 10_b_ to receive only a value indicated by the combination of the lowest tier's 99_a_ digit (e.g., "0") and the middle tier's 99_b_ digit (e.g., "3") for a total of "30" credits. The medium value indicator 110_b_ might qualify the gaming terminal 10_b_ to receive the value indicated by the combination of the lowest tier's 99_a_ digit (e.g., "5") and the middle tier's 99_b_ digit (e.g., "7"), and the top tier's 99_c_ digit (e.g., "3") for a total of "375" credits. The high value indicator 110_c_ might be used to qualify the player or gaming machine 10_b_ associated therewith to receive the optimal community-event outcome, which in the example shown is a 10× multiplier of the amount represented by the cascading digits on the three tiers, the top tier 99_c_ being the first digit, the middle tier 99_b_ being the second digit, and the bottom tier 99_a_ being the third digit. Thus, the high value indicator 110_c_ is shown to qualify the gaming terminal 10_b_ to receive the community-event multiplier for the value indicated by the combination of the lowest tier's 99_a_ digit ("5"), the middle tier's 99_b_ digit ("9"), and the top tier's 99_c_ digit (e.g., "9") for a total of "995" credits times ten or "9,950" credits. Although not shown in FIG. 6 for clarity, other gaming machines 10_a_, 10_c-n_ may have one or more similar indicators 110 placed adjacent the movable member 99.

Figure 12:
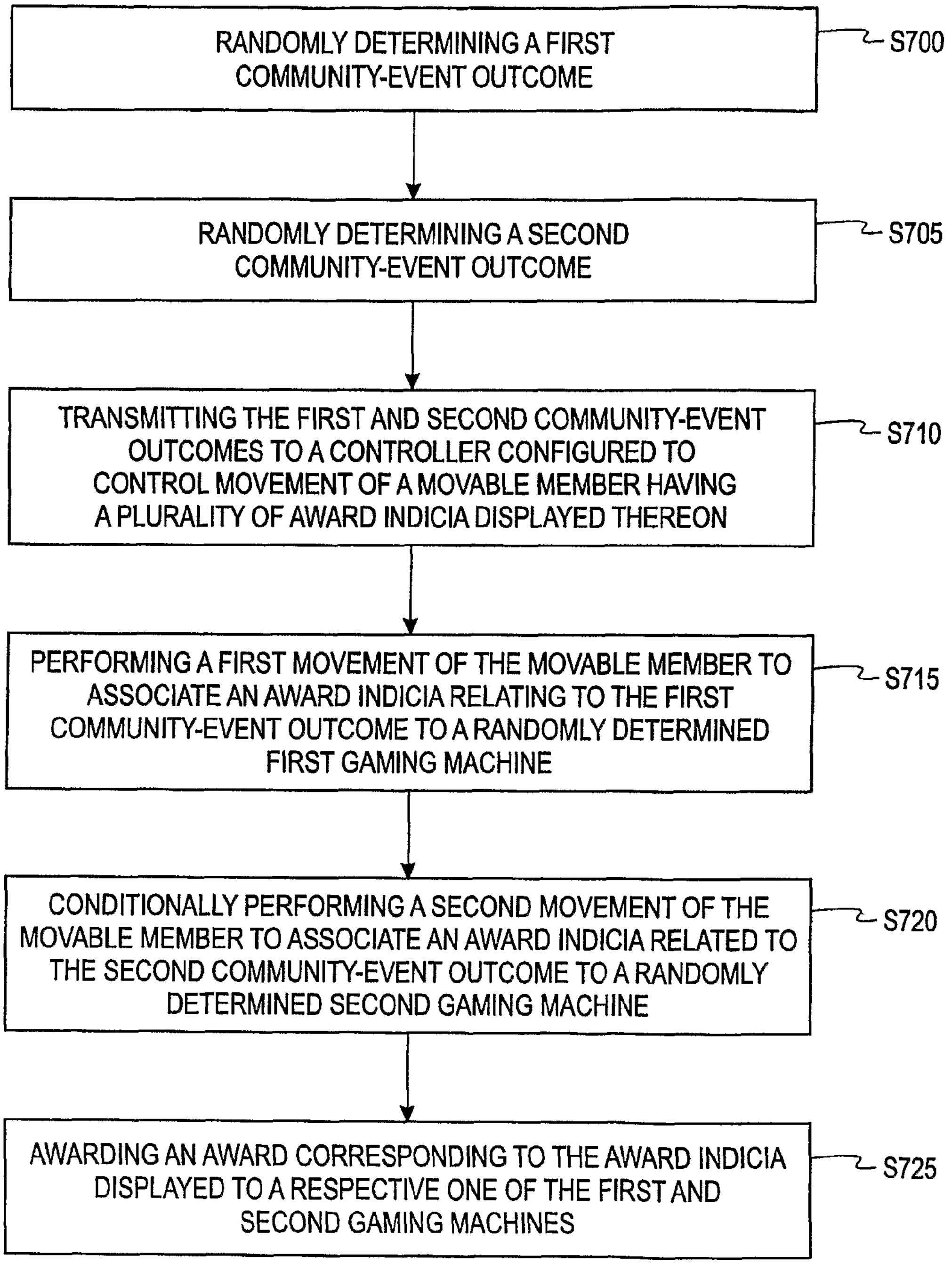
FIG. 12 is a flowchart showing at least some aspects of a method of conducting a community-event in accord with a sixth embodiment of the present concepts.

F. Method Including Providing First Community-Event Outcome and Second Community-Event Outcome Conditioned on Side Wager FIG. 12 shows another embodiment of a method of conducting a wagering game on a plurality of gaming machines 10_a-n_ eligible to play a community-event in accord with the present concepts. The method shown in FIG. 12 includes the steps of randomly determining a first community-event outcome (step S700) and a second community-event outcome (step S705).

The first and second community-event outcomes are transmitted, in step S710, to a controller (e.g., 34, 50) configured to control movement of a movable member 99 having a plurality of award indicia 101 displayed thereon. In accord with the transmission of signals corresponding to the first and second community-event outcomes in step S710, the controller performs a first movement of the movable member 99 to associate an award indicia 101 relating to the first community-event outcome to a randomly determined one of the gaming machines 10_a-n_ (step S715) (e.g., 10_a_) or indicator 110 associated therewith.

The controller then conditionally performs a second movement of the movable member 99 to associate an award indicia 101 relating to the second community-event outcome to one of the gaming machines 10_a-n_ (step S720) (e.g., 10_b_) or indicator 110 associated therewith. Step S720 is performed in response to an input from at least one of said plurality of gaming machines 10_a-n_. Absent such input, the method will ignore step S720 and proceed to award an award corresponding to the award indicia 101 to the first gaming machine (e.g., 10_a_) in a step S725.

The aforementioned input required of step S720 could comprise, for example, a side bet input prior to the step S715 of performing a first movement of the movable member 99. The method of this embodiment may accordingly further comprise the step of enabling the step of performing a second movement of the movable member by inputting a side bet into the gaming machine (e.g., 10_b_) prior to the step of performing a first movement of the movable member. A subsequent step may then include the act of performing the second movement of the movable member 99 only when the display of the award indicia 101 associated with the first community-event outcome is to a gaming machine (e.g., 10_a_) other than said gaming machine having the side bet input therein (e.g., 10_b_).

Thus, the side bet would function as a second chance at winning the community-event to the player making the side bet. In various aspects of this embodiment of the method, the player at the first gaming machine (e.g., 10_a_) may be stripped of the award. It is presently preferred, however, to permit both players to receive the benefit of the community-event award. In another aspect of this embodiment, the player at the first gaming machine (e.g., 10_a_) may retain the award only upon the condition that the player placed an additional side bet for award insurance, or the like. If step S720 is to be carried out, the method proceeds therefrom to step S725 comprising awarding an award corresponding to the award indicia 101 to at least one of the first and second gaming machines.

The step S720 of performing a second movement of the movable member 99 may include the movement of the entire movable member relative to the gaming machines 10_a-n_, or it may include the movement of only a portion of the movable member 99 relative to the gaming machines. In one example, the movable member 99 might comprise an outer annulus or reel 99_a_ and the portion might comprise a concentrically disposed inner wheel, reel or annulus 99_b_ configured to move or rotate independently of the movable member, such as is generally represented in FIGS. 5_c-d_ and 6. In one aspect, step S720 may include moving a rotating mechanical substrate 104 bearing a first award indicia on a first surface 103_a_ to display a second award indicia on a second surface 103_b_, such as is generally shown in FIG. 5_e_.

G. Method Including Associating First and Second Community-Event Outcomes to Gaming Machines Using Movable Member FIG. 12 shows still another embodiment of a method of conducting a wagering game on a plurality of gaming machines 10_a-n_ eligible to play a community-event. The method represented by FIG. 12 includes the steps of randomly determining a first community-event outcome (step S800) and randomly determining a second community-event outcome (step S805).

Once these outcomes have been determined, the method includes transmitting, in a step S810, the first and second community-event outcomes to a controller (e.g., 34. 50) configured to control movement of a movable member 99. The controller is then enabled to perform, in a step S815, a first movement of the movable member 99 to associate a first award associated with the first community-event outcome to a randomly determined first gaming machine (e.g., 10_a_). Subsequent to the first movement of step S815, the method includes performing in a step S820 a second movement of the movable member 99 to associate a second award associated with the second community-event outcome to a randomly determined second gaming machine (e.g., 10_b_).

The method also includes, in step S825, awarding the first award and the second award to a respective one of the first gaming machine (e.g., 10_a_) and the second gaming machine (e.g., 10_b_).

Figure 13:
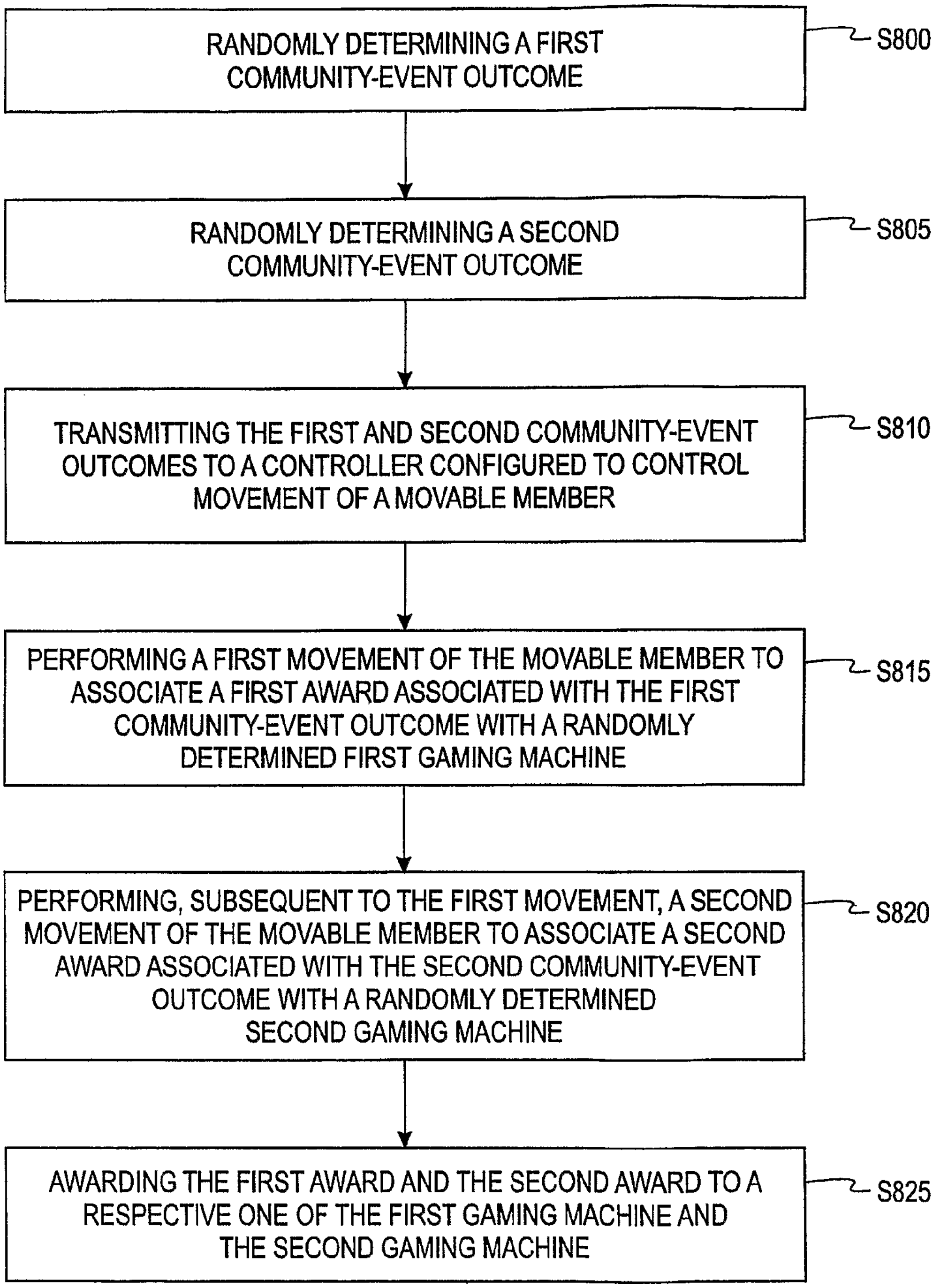
FIG. 13 is a flowchart showing at least some aspects of a method of conducting a community-event in accord with a seventh embodiment of the present concepts.

H. Method Including Assigning Indicator(s) to Eligible Gaming Machines, Determining a Community-Event Elimination Result, and Moving Movable Member to Display Community-Event Elimination Result FIG. 13 shows an embodiment of a method of conducting a community-event on a plurality of gaming machines 10_a-n_ disposed adjacent a movable member 99 which operates, by process of elimination, to determine a "survivor" of the community-event game.

This method includes a step S900 of assigning at least one indicator 110 to each of the plurality of gaming machines eligible to play the community-event. This embodiment further includes the step S905 of determining a community-event elimination result and a step S910 of moving the movable member 99 relative to the plurality of gaming machines 10*a-n* to associate the community-event elimination result to an indicator 110. Then, responsive to the community-event elimination result, that indicator 110 is eliminated from the set of indicators eligible to receive a community-event award in step S915. In accord with this method, the above steps S905, S910, and S915 are sequentially performed in a step S920 to continue eliminating remaining indicators 101 until a last indicator remains.

The community-event award is then awarded in a step S925 to a gaming machine associated with the last indicator. Thus, this embodiment functions to determine the "survivor" gaming machine through an elimination process. In accord with this method, other players may optionally place side wagers on players on other player's to win or lose.

In still another aspect, the community-event award that is awarded in step S925 to a gaming machine associated with the last indicator may be also awarded, in whole or in part, to the remaining gaming machines participating in the community-event game. Thus, the "survivor" may indirectly dictate the award received by the other participants in the community-event game.

Figure 14:
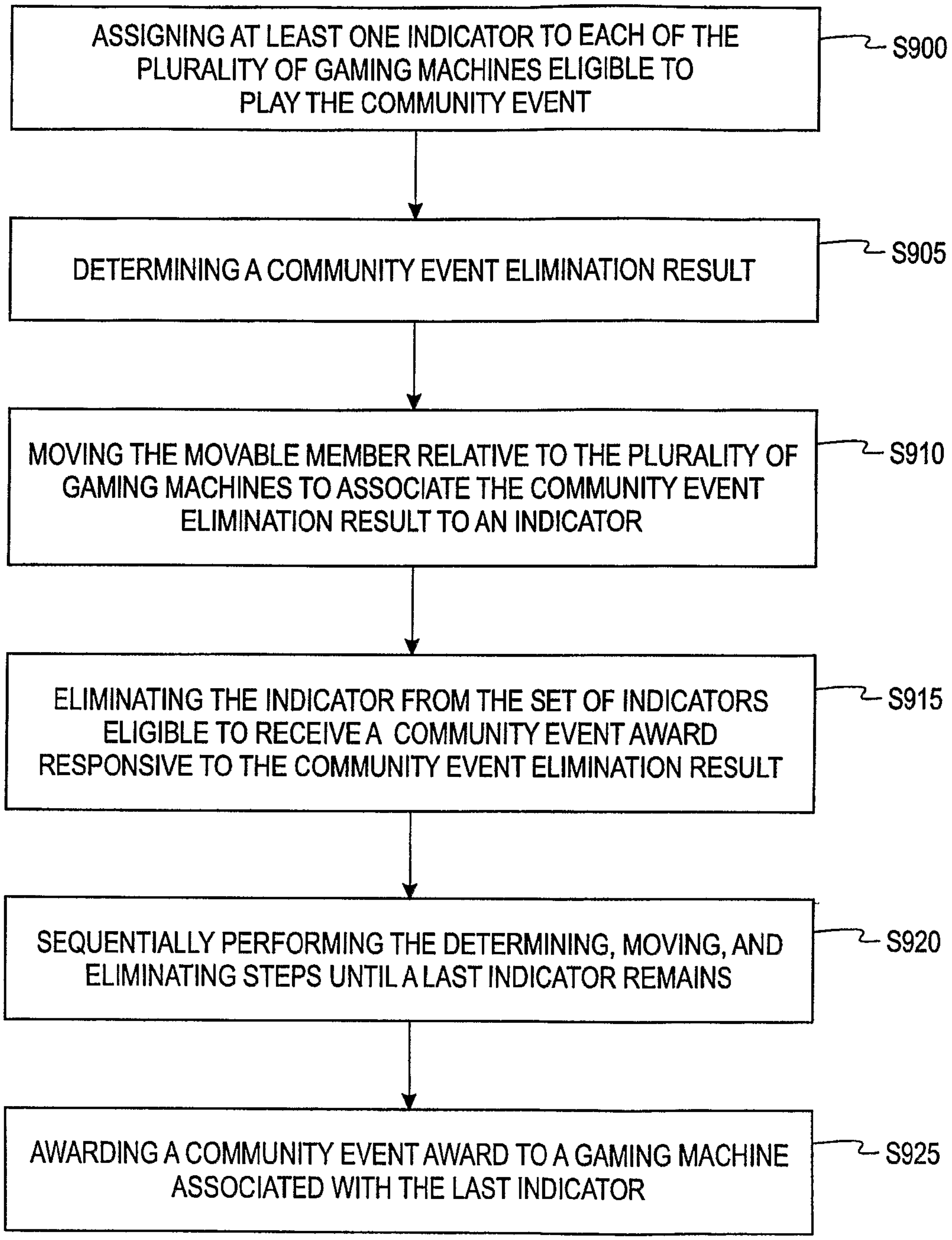
FIG. 14 is a flowchart showing at least some aspects of a method of conducting a community-event in accord with an eighth embodiment of the present concepts.
Figure 15:
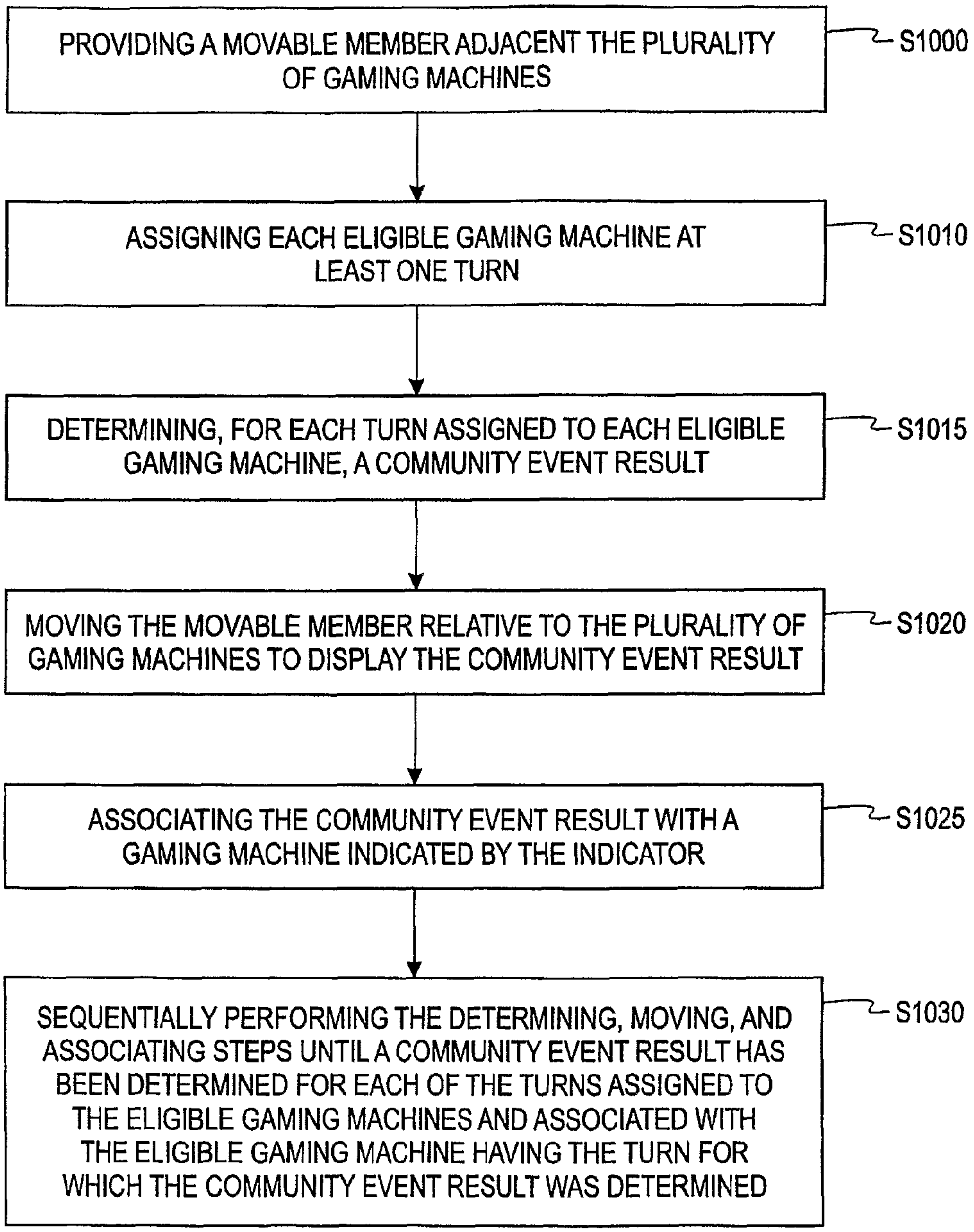
FIG. 15 is a flowchart showing at least some aspects of a method of conducting a community-event in accord with a ninth embodiment of the present concepts.

I. Method Including Assigning at Least One Turn to Each Eligible Gaming Machine and Moving Movable Member to Display Community-Event Result for Each Turn FIG. 14 shows In still another embodiment, a method of conducting a community-event on a plurality of gaming machines 10*a-n* including the steps of providing, in a step S1000 a movable member 99 bearing an indicator adjacent the plurality of gaming machines and a step S1010 assigning each eligible gaming machine at least one turn. For each turn assigned to each eligible gaming machine, a community-event result is determined in a step S1015.

The community-event result may then be transmitted, as a signal or instruction, to a controller (e.g., 34, 50) configured to control movement of the movable member 99. The method further includes the step S1020 of moving the movable member 99 relative to the plurality of gaming machines 10*a-n*, such as in accord with an instruction from the controller, to display the community-event result. In step S1025, the community-event result is associated with a gaming machine indicator by the indicator 101 of the movable member 99. In step S1030, the above steps of sequentially performing the determining (S1015), moving (S1020), and associating (S1025) steps are performed until a community-event result has been determined for each of the turns assigned to the eligible gaming machines and associated with respective ones of such eligible gaming machines. Subsequent steps may then include awarding an award associated with each of the displayed community-event results to a respective one of the gaming machines 10*a-n* associated with the community-event result.

In one aspect of the community-event game play in accord with at least the above embodiment, further method steps might include comparing the community-event results to determine which of the gaming machines 10*a-n* is associated with the greatest or highest value community-event result. For example, gaming machine 10*a* may have received 1000 credits in the community-event game, whereas the remaining participating gaming machines 10*b-n* received less than 1000 credits. In accord with this step or aspect of game play, gaming machine 10*a* is declared a winner of the community-event and is awarded another community-event award, which may be a fixed amount, an amount related to the community-event reward received by the gaming machine (i.e., 10*a* in this example) (e.g., 2×, 3× the community-event award amount, etc.), a progressive award, etc. The gaming machine to be designated as the winner of such additional community-event award may be determined in any manner, such as but not limited to, randomly, based on some aspect of wagering in the wagering game, or based on an outcome in the wagering game.

In a related aspect of the method, each eligible gaming machine may be assigned a plurality of turns. The community-event results for the plurality of turns assigned to each eligible gaming machine are then summed for the respective gaming machines and compared to determine the eligible gaming machine having the highest summed result. In this aspect, each player might be provided a number of rolls of the dice to move a movable or rotating game board (e.g., a Monopoly® board) 99 and associate game squares having various values to their gaming machine. In another example, a player might spin a movable member 99 comprising a reel or wheel, or the like, to associate award indicia 101 displayed thereon to their gaming machine.

In at least some aspects of this embodiment, it is presently preferred that each player is awarded the community-event result(s) associated with their individual turn(s). In this aspect, another community-event award may be awarded to a gaming machine satisfying some additional condition, such as but not limited to, achieving the greatest community-event result, exceeding a minimum wagering condition, achieving a certain absolute or relative outcome in the base wagering game, etc.

In accord with at least some of the above aspects and embodiments shown in FIGS. 3-15, bonus time (e.g., in the case of a time-based bonus or community-event) or eligibility for participation in a community-event (e.g., satisfaction of a triggering condition) can be stored or banked for later play on the same machine or a different machine or may even be redeemed. For example, if player has banked a certain bonus status that has not been realized (e.g., bonus time meter), the player can punch out, hit collect and they would get a ticket, voucher, or card coded, encrypted and/or printed on a substrate resistant to counterfeiting (e.g., a security ink on a security paper), for the value of the player's winnings and the information relating to the player's bonus status.

Each of these embodiments and obvious variations thereof is contemplated as falling within the spirit and scope of the claimed invention, which is set forth in the following claims. In at least some of the above embodiments and aspects, winners of the community-event-outcome may be denoted, in accord with the present concepts and any examples or embodiments present herein, in a conventional manner without recourse to the movable member 99. Such alternative manners of denoting winners could include, for example, the use of signage 62, lights and/or buzzers disposed in or adjacent the gaming machines 10*a-n*.

What is claimed is:

1. A method of conducting a community-event on a plurality of gaming machines disposed adjacent a movable member, the method comprising:

providing the movable member adjacent the plurality of gaming machines, the movable member bearing a plurality of award indicia;

providing a plurality of indicator positions disposed adjacent the movable member, each of the indicator positions being related to one of a plurality of potential outcomes for the community-event;

using at least one of one or more processors, assigning at least one indicator to each of the plurality of gaming machines that is eligible to play the community-event such that at least a first indicator is assigned to a first one of the plurality of gaming machines and a second indicator is assigned to a second one of the plurality of gaming machines;

associating the first indicator assigned to the first one of the plurality of gaming machines with a first one of the plurality of indicator positions;

associating the second indicator assigned to the second one of the plurality of gaming machines with the first one of the plurality of indicator positions;

using at least one of the one or more processors, determining a community-event elimination result;

first moving the movable member relative to the assigned indicators to associate the community-event elimination result with one or more of the assigned indicators;

eliminating the one or more of the assigned indicators associated with the community-event elimination result;

sequentially performing the determining, the first moving, and the eliminating acts until a last one of the assigned indicators remains;

determining a random community-event award outcome for the community-event;

transmitting the community-event award outcome to a controller configured to control movement of the movable member;

second moving the movable member relative to the last one of the assigned indicators; and stopping the moveable member such that the last one of the assigned indicators is associated with at least one of the plurality of award indicia.

2. The method of claim 1, wherein the at least one indicator assigned to each of the gaming machines comprises at least two indicators.

3. The method of claim 2, wherein the indicators are randomly assigned using at least one of the one or more processors.

4. The method of claim 1, wherein the assigning includes automatically assigning one respective indicator to each of the gaming machines and assigning at least one additional indicator to at least one of the gaming machines based on the occurrence of a predetermined event.

5. The method of claim 4, wherein the predetermined event comprises receiving an additional wager in the at least one of the gaming machines.

6. The method of claim 1, wherein the determining a random community-event award outcome includes:

determining a randomly selected first sub-outcome;

determining a randomly selected second sub-outcome; and aggregating the randomly selected first sub-outcome and the randomly selected second sub-outcome to obtain the random community-event award outcome.

7. A method of conducting a wagering game including a basic game and a community bonus game on a plurality of gaming machines disposed adjacent a movable member, the method comprising:

providing the movable member adjacent the plurality of gaming machines, the movable member bearing at least one award indicia;

using at least one of one or more processors, awarding a first indicator to each of the plurality of gaming machines that is eligible to play the community bonus game, each of the first indicators being associated with one of a plurality of potential outcomes for the community bonus game;

using at least one of the one or more processors, awarding a second indicator to a first one of the gaming machines and not to a second one of the gaming machines eligible to play the community bonus game based on an occurrence of a predetermined event;

determining a community-bonus-game elimination result;

first moving the movable member relative to the awarded indicators to associate the community-bonus-game elimination result with one or more of the awarded indicators;

eliminating the one or more of the awarded indicators associated with the community-bonus-game elimination result;

sequentially performing the determining, the first moving, and the eliminating acts until a last one of the awarded indicators remains;

second moving the movable member relative to the last one of the awarded indicators; and stopping the moveable member such that the last one of the awarded indicators is associated with the at least one award indicia.

8. The method of claim 7, wherein the predetermined event comprises receiving a predetermined wager from the first one of the gaming machines eligible to play.

9. The method of claim 7, wherein the predetermined event comprises the achievement of a predetermined rate of game play at the first one of the gaming machines during the basic game.

10. The method of claim 7, wherein the predetermined event comprises the achievement of a predetermined length of game play at the first one of the gaming machines during the basic game.

11. The method of claim 7, wherein the predetermined event comprises the participation in a player rewards program at the first one of the gaming machines during the basic game.

12. The method of claim 7, wherein each of the first indicators is automatically associated with one of the plurality of potential outcomes.

13. The method of claim 7, wherein each of the first indicators is associated with one of the plurality of potential outcomes based on an input received from a player in one or more of the gaming machines.

14. The method of claim 7, wherein the second indicator is associated with one of the plurality of potential outcomes for the community bonus game.

15. A method of conducting a community bonus game on a plurality of gaming machines disposed adjacent a movable member, the method comprising:

providing the movable member adjacent the plurality of gaming machines, the movable member bearing at least one award indicia;

providing a plurality of indicator positions disposed adjacent the movable member, each of the indicator positions being related to one of a plurality of potential outcomes for the community bonus game;

using at least one of one or more processors, assigning an indicator to each of the plurality of gaming machines that is eligible to play the community bonus game such that at least a first indicator is assigned to a first one of the plurality of gaming machines and a second indicator is assigned to a second one of the plurality of gaming machines;

associating, for a first play of the community bonus game, the first indicator assigned to the first one of the plurality of gaming machines with a first one of the plurality of indicator positions;

determining, for the first play of the community bonus game, a community-bonus-game elimination result;

moving, for the first play of the community bonus game, the movable member relative to the assigned indicators to associate the community-bonus-game elimination result with one or more of the assigned indicators;

eliminating, for the first play of the community bonus game, the one or more of the assigned indicators associated with the community-bonus-game elimination result;

sequentially performing the determining, the moving, and the eliminating acts until a last one of the assigned indicators remains for the first play of the community bonus game; and associating, for a second play of the community bonus game, the second indicator assigned to the second one of the plurality of gaming machines with the first one of the plurality of indicator positions.

16. The method of claim 15, further comprising:

prior to associating for the second play of the community bonus game, determining a random community-bonus-game outcome for the first play of the community bonus game;

transmitting the community-bonus-game outcome to a controller configured to control movement of the movable member;

moving the movable member relative to the last one of the assigned indicators; and stopping the moveable member such that the last one of the assigned indicators is associated with the at least one award indicia.

17. The method of claim 15, further comprising assigning an additional indicator to one or more of the gaming machines.

18. The method of claim 15, further comprising assigning an additional indicator to the first one of the plurality of gaming machines and not to the second one of the plurality of gaming machines.

19. The method of claim 18, further comprising associating, for the first play of the community bonus game, the additional indicator assigned to the first one of the plurality of gaming machines with the first one of the plurality of indicator positions.

20. The method of claim 18, further comprising associating, for the first play of the community bonus game, the additional indicator assigned to the first one of the plurality of gaming machines with a second one of the plurality of indicator positions that is distinct from the first one of the plurality of indicator positions.

21. The method of claim 15, wherein the indicators are randomly assigned using at least one of the one or more processors.

22. The method of claim 15, wherein the indicators are selectively associated with the indicator positions based on input received from players of the plurality of gaming machines.

23. The method of claim 1, wherein the first moving occurs prior to the second moving.

24. The method of claim 1, wherein the associating the first indicator assigned to the first one of the plurality of gaming machines includes selectively associating the first indicator assigned to the first one of the plurality of gaming machines with the first one of the plurality of indicator positions based on input received from a player of the first one of the plurality of gaming machines.

25. The method of claim 1, wherein the at least one indicator assigned to each of the plurality of gaming machines is a plurality of indicators such that each player of each of the plurality of gaming machines is able to accumulate indicators for use in the community-event or for use in a subsequent community-event.

26. The method of claim 7, wherein the first moving occurs prior to the second moving.

27. The method of claim 7, wherein each of the first indicators is associated with one of the plurality of potential outcomes based on an input received from a respective player of a respective one of the plurality of gaming machines.

* * * * *

UNITED STATES PATENT AND TRADEMARK OFFICE

CERTIFICATE OF CORRECTION

PATENT NO. : 8,628,407 B2
APPLICATION NO. : 11/991572
DATED : January 14, 2014
INVENTOR(S) : Arezina et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1376 days.

Signed and Sealed this
Twenty-second Day of September, 2015

Michelle K. Lee

Michelle K. Lee
*Director of the United States Patent and Trademark Office*